US012412069B1

(12) United States Patent
Gardner et al.

(10) Patent No.: US 12,412,069 B1
(45) Date of Patent: Sep. 9, 2025

(54) COOKIE SPACE DOMAIN ADAPTATION FOR DEVICE ATTRIBUTE PREDICTION

(71) Applicant: Google LLC, Mountain View, CA (US)

(72) Inventors: Joshua Patrick Gardner, Seattle, WA (US); Michael William Daub, Woodinville, WA (US); Alexander E. Mayorov, Kirkland, WA (US); Li He, Kirkland, WA (US); Wei Huang, Kirkland, WA (US)

(73) Assignee: Google LLC, Mountain View, CA (US)

( * ) Notice: Subject to any disclaimer, the term of this patent is extended or adjusted under 35 U.S.C. 154(b) by 993 days.

(21) Appl. No.: 17/508,715

(22) Filed: Oct. 22, 2021

Related U.S. Application Data

(60) Provisional application No. 63/107,849, filed on Oct. 30, 2020.

(51) Int. Cl.
*G06N 3/04* (2023.01)
(52) U.S. Cl.
CPC ..................... *G06N 3/04* (2013.01)
(58) Field of Classification Search
CPC ............. G06N 3/04; G06N 3/08; G06N 3/096
See application file for complete search history.

(56) References Cited

U.S. PATENT DOCUMENTS

| 10,999,146 | B1 * | 5/2021 | Savalle | .................... | G06N 3/08 |
| 11,954,610 | B2 * | 4/2024 | Hong | ..................... | G06N 20/00 |
| 2018/0107924 | A1 * | 4/2018 | Benson | .................. | G06N 20/10 |

OTHER PUBLICATIONS

Ganin et al, "Unsurpervised Domain Adaptation by Backpropagation", 2015 (Year: 2015).*
Sun et al, "Deep CORAL: Correlation Alignment for Deep Domain Adaptation", 2016, Computer Vision—ECCV 2016, pp. 443-450 (Year: 2016).*
Mahadevan et al, "A Unified Framework for Domain Adaptation Using Metric Learning on Manifolds", 2019, Machine Learning and Knowledge Discovery in Databases, pp. 860-877 (Year: 2019).*
Long et al., "Learning Transferable Features with Deep Adaptation Networks" International conference on machine learning. PMLR, Jun. 2015, 9 pages.

* cited by examiner

*Primary Examiner* — Michael J Huntley
*Assistant Examiner* — Christopher Dillon Devore
(74) *Attorney, Agent, or Firm* — Fish & Richardson P.C.

(57) ABSTRACT

The present disclosure describes techniques for training a model using cross-domain adaptation to classify content requests from client devices having unknown attributes. The system can obtain requests for content from client devices of a first domain, and requests for content from client devices of a second domain. The system can train a model by propagating request attributes of the first domain through the model to generate first internal data from an internal layer of the model and a first output vector an output layer of the model. The system can propagate request attributes of the second domain to generate second internal data, and determine a difference between the first internal data and the second internal data. The system can update the model based on the difference and the output vector, and classify a third client device of the second domain using the model.

20 Claims, 4 Drawing Sheets

COOKIE SPACE DOMAIN ADAPTATION FOR DEVICE ATTRIBUTE PREDICTION

CROSS-REFERENCE TO RELATED APPLICATIONS

This application claims priority to U.S. Provisional Application Ser. No. 63/107,849 filed on Oct. 30, 2020, the disclosure of which is incorporated in its entirety into this application.

BACKGROUND

In a computer-networked environment such as the internet, third-party content providers can provide third-party content items for display on end-user computing devices in response to requests for content. These third-party content items can be displayed on a web page associated with a respective publisher. These third-party content items can include content identifying the third-party content provider that provided the content item.

SUMMARY

Domain adaptation is a canonical problem in the field of machine learning, and several approaches are described herein to address this problem. The task of domain adaptation is important to the fields of computer vision and reinforcement learning, where the goal is often to train a model a smaller, more constrained dataset that performs well on broad or unknown sets of data (e.g., "in the wild"). One example of this is the task of training a model that can safely drive an autonomous vehicle under any conditions from a limited dataset of road, location, and traffic conditions. Although the techniques described herein are generally directed to classifying content requests from client devices with unknown or irretrievable attributes, the techniques of the present disclosure can be utilized in models having other datasets and other models, such as deep learning models, which is also the general model used for many other modeling tasks.

At least one aspect of the present disclosure relates to a method for training a model using cross-domain adaptation to classify content requests from client devices having unknown attributes. The method can include maintaining a first plurality of requests for content from a respective first plurality of client devices of a first domain. The respective first plurality of client devices can have device attributes. Each of the first plurality of requests can have first request attributes. The method can include maintaining a second plurality of requests for content from a respective second plurality of client devices of a second domain. Each of the second plurality of requests can have second request attributes. The method can include training a model. The method can include propagating the first request attributes of a first client device of the first plurality of client devices through the model to generate first internal data extracted from a layer of the model that is prior to an output layer. The method can include generating a first output vector by propagating the first request attributes through the model to the output layer. The method can include propagating the second request attributes of a second client device of the second plurality of client devices through the model to generate second internal data extracted from the layer of the model that is prior to the output layer. The method can include determining a difference between the first internal data and the second internal data. The method can include updating weights of the model based on the difference between the first internal data and the second internal data, and a difference between the first output vector and the device attributes of the first client device. The method can include classifying third device attributes of the second domain using the model.

At least one aspect of the present disclosure relates to a computer-implemented method for training a classification model using cross-domain adaptation to classify content requests from client devices having unknown or incomplete attributes. The method can include obtaining, by a data processing system comprising one or more processors and a memory, a first plurality of requests for content from a respective first plurality of client devices of a first domain, the respective first plurality of client devices having device attributes, each of the first plurality of requests having first request attributes; and obtaining, by the data processing system, a second plurality of requests for content from a respective second plurality of client devices of a second domain, each of the second plurality of requests having second request attributes. The method can include training, by the data processing system, a model, comprising: propagating, by the data processing system, the first request attributes of a first client device of the first plurality of client devices through the model to generate first internal data extracted from a layer of the model; generating, by the data processing system, a first output vector by propagating the first request attributes through the model to an output layer; propagating, by the data processing system, the second request attributes of a second client device of the second plurality of client devices through the model to generate second internal data extracted from the layer of the model; determining, by the data processing system, a difference between the first internal data and the second internal data; and updating, by the data processing system, weights of the model based on the difference between the first internal data and the second internal data, and a difference between the first output vector and the device attributes of the first client device.

In some implementations, the first request attributes comprises one or more attribute types that are unavailable in the second request attributes. In some implementations, the first request attributes comprises one or more attribute types and complete attribute data corresponding thereto, and the second request attributes comprises incomplete or unavailable attribute data corresponding to the one or more attribute types.

In some implementations, the method further comprises classifying, by the data processing system, third device attributes of the second domain using the model.

In some implementations, the method further comprises sending, by the data processing system, the model to a computing device for classifying third device attributes of the second domain.

In some implementations, determining, by the data processing system, the difference between the first internal data and the second internal data comprises: calculating a loss of the model using a loss function at least partly based on a predetermined domain adaptation technique.

In some implementations, the method further comprises wherein the loss function comprises an adjustment term determined based on the predetermined domain adaptation technique.

In some implementations, the predetermined domain adaptation technique comprises one or more of: correlational alignment, reverse gradient, importance reweighting, and maximum mean discrepancy.

In some implementations, the method further comprises the layer of the model is selected based on the predetermined domain adaptation technique.

In some implementations, determining, by the data processing system, the difference between the first internal data and the second internal data comprises calculating a loss of the model using a loss function at least partly based on minimizing a difference in two covariances, each calculated based on the first internal data and the second internal data.

At least one aspect of the present disclosure relates to a computer-implemented system for training a classification model using cross-domain adaptation to classify content requests from client devices having unknown or incomplete attributes. The system can comprise one or more hardware processors configured to perform operations. The operations can comprise obtaining, by a data processing system comprising one or more processors and a memory, a first plurality of requests for content from a respective first plurality of client devices of a first domain, the respective first plurality of client devices having device attributes, each of the first plurality of requests having first request attributes; obtaining, by the data processing system, a second plurality of requests for content from a respective second plurality of client devices of a second domain, each of the second plurality of requests having second request attributes. The operations can comprise training, by the data processing system, a model. The training of the model can comprise: propagating, by the data processing system, the first request attributes of a first client device of the first plurality of client devices through the model to generate first internal data extracted from a layer of the model; generating, by the data processing system, a first output vector by propagating the first request attributes through the model to an output layer; propagating, by the data processing system, the second request attributes of a second client device of the second plurality of client devices through the model to generate second internal data extracted from the layer of the model; determining, by the data processing system, a difference between the first internal data and the second internal data; and updating, by the data processing system, weights of the model based on the difference between the first internal data and the second internal data, and a difference between the first output vector and the device attributes of the first client device.

At least one aspect of the present disclosure relates to a non-tangible memory device storing executable instructions for training a classification model using cross-domain adaptation to classify content requests from client devices having unknown or incomplete attributes. The non-tangible memory device upon execution can perform operations comprising: obtaining, by a data processing system comprising one or more processors and a memory, a first plurality of requests for content from a respective first plurality of client devices of a first domain, the respective first plurality of client devices having device attributes, each of the first plurality of requests having first request attributes; obtaining, by the data processing system, a second plurality of requests for content from a respective second plurality of client devices of a second domain, each of the second plurality of requests having second request attributes. The operations can further comprise training, by the data processing system, a model, comprising: propagating, by the data processing system, the first request attributes of a first client device of the first plurality of client devices through the model to generate first internal data extracted from a layer of the model; generating, by the data processing system, a first output vector by propagating the first request attributes through the model to an output layer; propagating, by the data processing system, the second request attributes of a second client device of the second plurality of client devices through the model to generate second internal data extracted from the layer of the model; determining, by the data processing system, a difference between the first internal data and the second internal data; and updating, by the data processing system, weights of the model based on the difference between the first internal data and the second internal data, and a difference between the first output vector and the device attributes of the first client device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks) or intangible carrier media (e.g. communications signals). Aspects can also be implemented using suitable apparatus, which can take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
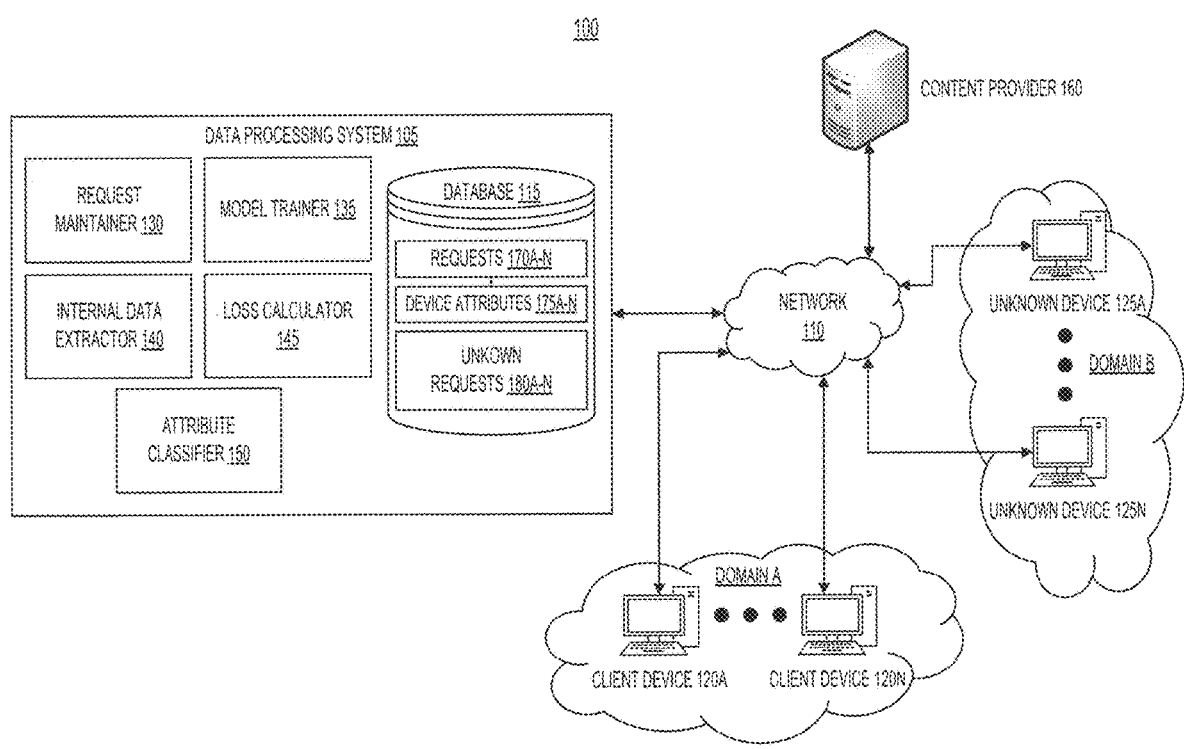
FIG. 1 illustrates a block diagram of an example system for training a model using cross-domain adaptation to classify content requests from client devices having unknown attributes.

Below are detailed descriptions of various concepts related to, and implementations of, techniques, approaches, methods, apparatuses, and systems for training a model using cross-domain adaptation to classify content requests from client devices having unknown attributes. The various concepts introduced above and discussed in detail below can be implemented in any of numerous ways, as the described concepts are not limited to any particular manner of implementation. Examples of specific implementations and applications are provided primarily for illustrative purposes.

Content providers can provide content, such as text, images, video, webpages or applications, to client devices. Those same content providers have an interest in measuring or keeping records of the client devices that access their content. For example, by performing analysis on client device behavior, such as interactions, requests, page-visits, or any other kind of online activity, content providers can identify client device information that is relevant to content selection and generation. The analysis of client devices is usually performed can be improved by using a cookie stored by an application, such as a web browser, to obtain information about, and online activities performed by, the client devices that access content provided by content providers.

However, cookies and other similar information gathering techniques are not compatible with all client devices or applications. Certain web browsers or applications may implement analysis prevention techniques that prevent cookies from accurately obtaining information about client devices. Applications may also implement temporary sessions that prevent the collection of accurate analysis data, or prevent the collection of accurate client device information, such as client device identifiers or information associated with the client devices. To circumvent these issues, content providers often train machine-learning models to predict the attributes of client devices that prevent record keeping or analysis techniques.

The machine-learning models generated by the content providers can be trained using known information, which can in turn be obtained via cookies or similar record keeping or analysis techniques. However, the attributes of client devices that allow cookie analysis or other similar record keeping techniques are often not the same as the attributes of client devices that otherwise block or prevent record keeping or analysis. These groups can be considered two different domains: one domain of client devices that allow record keeping or analysis, and another domain of client devices that do not allow record keeping or analysis. Because these domains often have different attributes, a machine-learning model that is trained on the domain of client devices that enable such analysis will often generate inconsistent results when predicting attributes of client devices that block similar analysis techniques. It would therefore be advantageous for a machine-learning model trained on client devices that enable record keeping and analysis to produce accurate and consistent output when used to classify characteristics of client devices that block such analysis techniques.

The systems and methods of the present disclosure can train an accurate classification model on a space of client devices that enable device measurement or analysis, but can be used to predict characteristics of client devices that block measurement or analysis. More particularly, the systems and methods of this technical solution can utilize domain adaptation techniques, such as importance reweighting or maximum mean discrepancy, to train a machine learning model on a source domain (devices that enable record keeping or have record keeping enabled) to classify devices in a target domain (devices that disable or block record keeping or have record keeping blocked). Although data for the target domain is unknown, the systems and methods described herein can utilize unsupervised or self-supervised domain adaptation to train the model on known data. Techniques such as correlational alignment or reverse gradient techniques can analyze the outputs of the intermediate, or hidden, layers of the machine-learning model during training and adjust model parameters to ensure that the internal representations of both the source and target domains are similar. Thus, the systems and methods described herein can utilize known attributes of client devices that enable record keeping as training data to train a model that can accurately predict the attributes of client devices that disable or block record keeping.

Cookies can enable much of the functionality and personalization of modern web browsers. Cookies can allow for the authentication of client device attributes, which enables cross-site record keeping. This can allow for information about client devices, or attributes of client devices, to be analyzed across different webpages, which can allow for accurate content personalization. This personalization can be based on machine-learning models that use known attributes from previously observed client devices, for example, attributes of an entity (e.g., a user of the client device), or an entity associated with an account of the client device, browsing behavior such as previous webpages visited and any interactions that occur on those webpages, etc.) to infer the attributes of other client devices when these attributes are unknown. These predicted attributes can be used as input to various content personalization systems and enable the provision of personalized content based on these attributes.

In addition, the device attributes can reveal information about the technical capabilities of a device, for example a device having a particular display size or resolution, or a capability to display or present certain content. Some client devices may be unable to present content in certain formats, or may display content in a particular resolution. By accessing these device attributes using cookie information, content selection systems can select and provide content to client devices that is technically suitable for presentation on a client device. However, client devices that block such attribute information may prevent content selection systems from selecting content that is technically suited for a particular client device. When this information is unavailable, content selection and provision systems provide content that cannot properly display or render on a client device. Therefore, accurately predicting the device attributes of client devices can allow for the selection and provision of content that is more technically suited for a client device, even when these device attributes of the device are unavailable.

Depending on the information available from a browser of the client device at the time of a request, different "cookie spaces" are used to label attributes of a client device. These cookie spaces have different levels of reliability and persistence. Furthermore, maintained attributes about a client device may be linked to a specific type of cookie; for example, the certain items of the attribute information may be known for devices with a cookie of type A, while other items of the attribute information may be known for devices with a cookie of type B. These cookie types are for example purposes, and should not be understood as limiting the scope of how attribute data is maintained for different client devices.

As a result, content provider systems often train models based on a subset of cookie spaces (e.g., in some cases having a subset of the attribute data, etc.) for which the desired labels are available, but to deploy those models on other cookie spaces. This can lead to performance degradation, since the behaviors of client devices in different cookie spaces may be different and the model is optimized for prediction performance only on the dataset used to train the model. For example, client devices having accounts in a particular domain may demonstrate different characteristics than devices without accounts on that domain. Further, client devices blocking cookie analysis in certain circumstances, such as a "private" or "incognito mode" implemented in a browser, also have different browsing behavior or device attribute characteristics than client devices that enable or do not block cookie analysis. These could cause a model trained only on client devices with accounts from a particular domain and cookies enabled to perform poorly on other groups.

This is known more generally as "domain adaptation" in the field of machine learning, where models are trained on one data distribution (e.g., domain, etc.) but deployed or evaluated against a different distribution. The present disclosure describes different techniques for addressing the task of domain adaptation in the context of cookie spaces for attribute prediction in online content provision. In particular, the systems and methods described herein can improve content selection and provision systems by accurately predicting the technical device attributes of a client device, such as display capability (e.g., display size or resolution, etc.), display format compatibility (e.g., ability to display certain content due to software limitations, etc.), processing capability to process and display certain content (e.g., presenting content that does not hinder client device performance in a meaningful way, etc.), and other technical device attributes as described herein.

These challenges are relevant to domain adaptation across cookie spaces and domain adaptation from a "cookie" space to a "non-cookie" space. Modern web infrastructure is rapidly shifting away from the use of third-party cookies entirely, with many client devices and browsers or applications already blocking third-party cookies. Thus, specialized domain adaptation methods are useful in order to ensure that existing data (e.g., collected using cookies) could be used to train reliable attribute prediction models which perform well on non-cookie browsing data from unknown client devices.

Requesting content can include transmitting one or more uniform resource identifiers (URIs) including one or more parameters about the client device making the request. The URI parameters can include information stored in one or more cookies maintained on the client device. Parameters included in a request for content can include, for example, account identifiers (e.g., email address, username, unique integer number or string, etc.), client device information (e.g., device type, current device time, etc.), and contextual information (e.g., what information resources are accessed or interacted with by a client device, etc.), among others. Content requests can include other information, such as information that identifies an interaction or a different request for content on an information resource. Such identifiers can be content-network identifiers that identify what content has been provided to or viewed by client devices associated with that identifier. Content requests that include accurate identifiers of client devices can identify a domain of client devices that allow record keeping or allow information about the client device to be transmitted in requests for content. Likewise, content requests that do not include any identifier, or may not include an accurate (e.g., temporarily created, etc.) identifier of a client device can identify a domain of client devices that do not allow record keeping or do not allow information about the client device to be transmitted in requests for content.

Domains can include sets of data having particular characteristics or attributes. Models, such as neural networks, are trained to identify patterns in input data that are correlated outcome attribute(s) of a client device. However, to make accurate predictions about unknown or unclassified client devices, those same correlations must hold true for that second domain. Input data from different domains may have attributes that are correlated to the desired outcome prediction differently, and thus produce inconsistent results when input to the model for a prediction.

In a domain adaptation process, a source domain can be the data that is used to learn the parameters of a machine learning model ("training" the model), and for which labels are available or known. The model is trained to learn the association between a set of input features and one or more target labels. A target domain can include the data used to evaluate or deploy a trained machine-learning model, on which optimal performance is desired. The target domain can be different from the source domain (e.g., the source domain may be identifiers or characteristics having first attributes, and the target domain may have different attributes, etc.). The source domain and the target domain can have different marginal or joint distributions of observations x and labels y. The target domain data can include labels, but may be partially or entirely unlabeled.

According to some aspects, the present disclosure is related to cookies (such as third-party cookies), attribute prediction models, and to general algorithms for domain adaptation. Third-party cookies can be files, which are stored on a client device and are visible to services other than the service that generated the cookie during browsing or application use. Cookies enable client devices to be identified across websites or other information resources, which allows client devices to stay signed-in to various accounts when they return to a website or information resource. Cookies can also enable the detection of interactions with information resources by recording whether client devices viewed content on an information resource and later interacted with the content. Cookies can also supports content personalization by exposing information about the attributes of the client device or browsing activity to content providers.

Attribute prediction models can be used to predict various attributes of client devices during web browsing and other activity. The inferred attributes are used when the actual attributes of a client device are not known or available. These attributes are used to generate personalized content, often through content personalization system. Attribute inferences may be consumed by many downstream services used to provide content.

The techniques described herein apply domain adaptation to attribute prediction models to achieve domain adaptation across cookie spaces or other identifier spaces or domains. Below, several approaches to this task are described. There are many approaches to domain adaptation, which could be appropriate for a cookie-domain adaptation system as described herein.

For all of the notation below, let $L(\cdot)$ denote the loss function for a fixed model and set of parameter weights, let $P_T(x)$ and $P_S(x)$ indicate the probability of observation x under the target and source distributions (domains), respectively. Notation is used for the discrete case, but this notation generalizes to the continuous case analogously. In training a machine-learning model according to empirical risk minimization, the goal of training is to find the optimal model, $f^*$, which minimizes the loss function L over the observed distribution in the training dataset by solving the following optimization problem:

$$f^* = \arg\min_{f \in H} \sum_{i=1}^{n} P_S(x, y) \cdot L(x, y, f) = \arg\min_{f \in H} [E_{x,y \sim S}[L(x, y, f)]] \quad (1)$$

Domain adaptation can address the following challenges:
(i) differences in the observed distribution of the features/observations, x, in the source and target domains; formally $P_T(x) \neq P_S(x)$.
(ii) differences in the dependency of the label on the data, formally:

$P_T(y|x) \neq P_S(y|x)$.

The presence of either (i) or (ii) can indicate that the optimal model $f^*$ on the source domain may not be the same as the optimal model $f^*$ on the target domain, which can motivate the use of domain adaptation techniques to train a model that can achieve good performance on the target domain. The techniques described in the present disclosure can use domain adaptation techniques to address the domain adaptation problem in the context of cookie spaces, or differences in information included in content requests received from client devices. For example, where client devices that provide content requests including reliable information such as an identifier can be considered part of one domain (e.g., the source domain, having known attributes or labels, etc.). Likewise, client devices that provide content requests without that reliable information can be in a second domain of unknown devices for which labels are not available or are incomplete.

Particular techniques implemented by the systems and methods described herein can include importance reweighting, maximum mean discrepancy, correlational alignment, reverse gradient, and other techniques.

Importance Reweighting: Importance reweighting is a technique for reweighting the training examples based on their density (or "importance") in the target domain. This can be achieved by modifying the loss function to be weighted according to the target domain, instead of the source domain. This can be written as the following modification to equation (1):

$$f^* = \arg\min_{f \in H} \sum_{i=1}^n P_S(x, y) \cdot L(x, y, f) = \arg\min_{f \in H} \sum_{i=1}^n \frac{P_T(x, y)}{P_S(x, y)} P_S(x, y) \cdot L(x, y, f) \quad (2)$$

Note that solving this modification directly minimizes the expected loss on the target domain as desired, since using the modified loss function in (2) is equivalent to $$\arg\min_{f \in H} [E_{x,y \sim S}[L(x, y, f)]]$$

in equation (1)

Importance reweighting is the theoretically optimal approach to domain adaptation, but it has a strict set of assumptions that may not be met in some circumstances. This can include non-zero support of the source distribution everywhere (this would require that all observations x in the target domain are observed, also in the source domain, in the training set, which may be unlikely in practice).

Maximum Mean Discrepancy: In this approach, neural network architecture can be adjusted to learn transferable features. In particular, after a model is trained on the source domain, the later layers in the model, which tend to learn domain-specific features, are fine-tuned or re-trained on the target domain. In particular, this approach uses the multiple-kernel maximum mean discrepancy (MK-MMD) to adapt features in the neural network so that the features it learns are transferable between domains. The objective function for a model trained using this approach could incorporate a regularizer based on MK-MMD, thus optimizing the following loss during training:

$$f^* = \arg\min_{f \in H} \frac{1}{n}\sum_{i=1}^n L(x, y, f) + \lambda \sum_{l=l_1}^{l_2} d_k^2(D_S^l, D_T^l) \quad (3)$$

where $l_1$, $l_2$ indicate the layer indices between which the regularizer is used (as mentioned above, usually later layers of the model) and $d_k^2(D_S^l, D_T^l)$ can be the MK-MMD between the source and target distributions evaluated at the l-th layer of the model.

Note that each of these techniques may require labeled data in the target domain. However, the systems and methods described herein can be extended to apply to unlabeled target data. For example, in the case where only cookie-based data is available for training, but the model is evaluated on non-cookie data for which there may be no known labels. Generally, techniques that do not rely on labeled data in the target domain aim to ensure that the internal representations of the data within the source and the target domain are similar when propagated through a model. Such techniques can include correlation alignment (CORAL), and reverse gradient techniques.

Correlational Alignment (CORAL): CORrelational Alignment (CORAL) performs unsupervised domain adaptation, and is therefore useful when no labels are available for the target domain. CORAL can minimize domain shift by aligning the second-order statistics of source and target distributions, without requiring any target labels. During training, CORAL loss is added to minimize the difference in the covariance of learned features across domains:

$$\sum_i L(x, y, f) + \frac{1}{4d^2}\|C_S - C_T\|_F^2 \quad (4)$$

where the second term in (4) is the CORAL loss, and measures the differences in the covariance between the learned features from the source and target data in the model's output from the source and target domains ($C_S$ and $C_T$, respectively) which are defined in the equations below:

$$C_S = \frac{1}{n_S - 1}\left(D_S^T D_S - \frac{1}{n_S}(1^T D_S)^T(1^T D_S)\right) \quad (5)$$

$$C_T = \frac{1}{n_T - 1}\left(D_T^T D_T - \frac{1}{n_T}(1^T D_T)^T(1^T D_T)\right) \quad (6)$$

where 1 is a column vector with all elements equal to 1, $D_S$ represents a set of d-dimensional deep layer activations of an input $I_S$ from the source domain, $D_T$ represents a set of d-dimensional deep layer activations of an input $I_T$ from the target domain, and $n_S$ and $n_T$ represent the number of source and target data, respectively.

Reverse Gradient: The reverse gradient approach can utilize a "gradient reversal" layer to confuse a binary "domain classifier" attempting to discriminate between the source and target domains. This can have the effect of encouraging the learning of generalizable features between the two domains. This model can be trained using backpropagation methods. During training, this approach can minimize the objective:

$$\Sigma_t L(x,y,f) - \lambda \Sigma_t L_d(f,x) \quad (7)$$

The system and methods described herein can be used for ensuring reliable model performance for attributes prediction models trained across different cookie, or attribute, spaces. Although the techniques described herein can be useful for adapting models trained on any third-party cookie space to a non-third-party cookie space, the techniques can also be useful in adapting models across difference cookie spaces (e.g., using one cookie or identifier domain to predict attributes of a different cookie domain, etc.).

In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed. Thus, the user may have control over what information is collected about the user, how that information is used, and what information is provided to the user.

Referring now to FIG. 1, illustrated is a block diagram of an example system 100 for training a model using cross-domain adaptation to classify content requests from client devices having unknown attributes, in accordance with one or more implementations. The system 100 can include at least one data processing system 105, one or more client devices 120A-N (sometimes generally referred to as client device(s) 120), one or more unknown devices 125A-N (sometimes generally referred to as unknown device(s) 125), at least content provider 160, and at least one network 110. The data processing system 105 can include at least one database 115, at least one request maintainer 130, at least one model trainer 135, at least one internal data extractor 140, at least one loss calculator 145, and at least one attribute classifier 150. The database 115 can include one or more requests 170A-N (sometimes generally referred to as requests 170), one or more device attributes 175A-N (sometimes generally referred to as attributes 175), and one or more unknown requests (sometimes generally referred to as unknown requests 180).

The client devices 120 can have attributes that are known or maintained (e.g., as the attributes 175, etc.) by the data processing system 105, and can be considered a part of domain A (e.g., a "cookie-space" A). The unknown devices 125 can have attributes that are partially or completely unknown (e.g., not stored in computer memory, etc.) by the data processing system 105, and can be considered a part of domain B (e.g., "cookie-space" B). Note that as used herein, domain does not necessarily describe the Internet domain or network domain through which the client devices 120 and the unknown devices 125 access the network 110, but instead can refer to a group of devices for which a certain amount of information is known. It should be understood that "domain A" and "domain B" are used simply for example purposes, and that any number of domains, corresponding to any amount of known or unknown information, can be used in the techniques described herein.

Each of the components (e.g., the data processing system 105, the content provider 160, the client devices 120, the unknown devices 125, the network 110, the request maintainer 130, the model trainer 135, the internal data extractor 140, the loss calculator 145, the attribute classifier 150, the database 115, etc.) of the system 100 can be implemented using the hardware components or a combination of software with the hardware components of a computing system (e.g., computing system 400 detailed herein in conjunction with FIG. 400, the data processing system 105, any other computing system described herein, etc.). Each of the components of the data processing system 105 can perform the functionalities detailed herein.

The data processing system 105 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The data processing system 105 can include one or more computing devices or servers that can perform various functions as described herein. The data processing system 105 can include any or all of the components and perform any or all of the functions of the computer system 400 described herein in conjunction with FIG. 4.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with at least one client device 120 or at least one unknown device 125. The network 110 can be any form of computer network that can relay information between the client devices 120, the unknown devices 125, the content provider 160, the data processing system 105, and one or more content sources, such as web servers or other external servers or computing systems, amongst others. In some implementations, the network 110 can include the Internet and/or other types of data networks, such as a local area network (LAN), a wide area network (WAN), a cellular network, a satellite network, or other types of data networks. The network 110 can also include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client devices 120, the unknown devices 125, the computer system 400, etc.) can communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105, the client devices 120, the unknown devices 125, the computer system 400, etc.) can also communicate wirelessly with the computing devices of the network 110 via a proxy device (e.g., a router, network switch, or gateway).

Each of the client devices 120 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 120 can include one or more computing devices or servers that can perform various functions as described herein. The client devices 120 can include any or all of the components and perform any or all of the functions of the computer system 400 described herein in conjunction with FIG. 4.

Each of the client devices 120 (sometimes referred to as "known client devices 120") can be computing devices configured to communicate via the network 110 to access information, such as web pages via a web browser, or application resources via a native application executing on a client device 120. When accessing information resources, the client device can execute instructions (e.g., embedded in the native applications, in the information resources, etc.) that cause the client devices to request content from one or more content sources (e.g., the content provider 160, the data processing system 105, etc.). The client devices 120 can transmit content requests via the network 110 to the data processing system 105 to request content for display on the client device 120. The client devices 120 can include configurations or settings that cause the client device 120 to transmit device attributes about the client device (e.g., device attributes 175 that correspond to the client device 120 making the request, etc.).

A request for content transmitted by a client device 120 can include an identifier of the requested content, a location identifier of requested content (e.g., a uniform resource identifier (URI), etc.), an identifier of a location of the client device (e.g., country, global positioning system (GPS) coordinates, etc.), information, such as text information, image information, metadata, script information, among others, from an information resource (e.g., the information resource or application resource that includes instructions causing the client device to transmit the request for content, etc.) being displayed on the client device 120. The requests for content transmitted by client devices 120 can include a timestamp that identifies the time the request for content was transmitted, a network domain accessed by the client device 120, category information about an information or application resource accessed by the client device, and information about interactions received by the client device 120, among others. In some implementations, the requests for content can be hypertext transfer protocol (HTTP) requests, file transfer protocol (FTP) requests, hypertext transfer protocol secure (HTTPS) requests, file transfer protocol secure (FTPS), or any other type of request that can cause the client device 120 to receive content via the network 110. In circumstances where the client devices 120 do not block the transmission of device attributes, the requests for content transmitted by the client device 120 can include technical device attributes of the client device 120, such as display capability (e.g., display size or resolution, etc.), display format compatibility (e.g., ability to display certain content due to software limitations, etc.), processing capability to process and display certain content (e.g., presenting content that does not hinder client device performance in a meaningful way, etc.), operating system type, a web browser identifier, or an application identifier, among others.

In response to the requests for content, the client devices 120 can receive requested content via the network 110. The requested content can be retrieved by a computing device external to the client device 120 (e.g., the data processing system 105, the content provider 160, etc.), and transmitted to the client device 120 via the network 110. Content provided to the client device 120 in response to a content request can include a script or other instructions to render the content in a particular location, or in a particular format or configuration. For example, the script included with the content received by the client device can include instructions that cause the client device to insert the content into an information resource, such as rendered webpage or an application page. In some implementations, the script can cause the client device 120 to transmit a confirmation message to the device that provided the content (e.g., the data processing system 105, the content provider 160, etc.), that confirms the client device 120 has rendered the requested content. Content provided to the client device 120 can be any form of content, include text, images, videos, or any combination thereof. In some implementations, the content can include an information resource such as a webpage. The content provided to the client device 120 can be selected in accordance with a content selection policy. A content selection policy can select content to provide certain content to the requesting client device based on information included in the request, known attributes of the client device 120 (e.g., device attributes 175, etc.). Because each of the client devices 120 have corresponding known device attributes 175 that are maintained by the data processing system 105, those client devices 120 can be considered part of "domain A," as described herein above.

Each of the unknown devices 125 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The unknown devices 125 can include one or more computing devices or servers that can perform various functions as described herein. The unknown devices 125 can include any or all of the components and perform any or all of the functions of the computer system 400 described herein in conjunction with FIG. 4.

Each of the unknown devices 125 can be computing devices configured to communicate via the network 110 to access information, such as web pages via a web browser, or application resources via a native application executing on an unknown device 125. Although similar to the client devices 120 in capability and functionality, the unknown devices 125 differ in that they may not maintain or provide any attribute information (e.g., such as the device attributes 175, etc.). For example, the unknown devices 125 may not allow or maintain cookies provided by the data processing system 105, or the content provider 160, as the case may be. The unknown devices 125 may block third-party cookies, and thus do not maintain attribute data about the respective unknown device 125 when accessing different information resources or different application resources. In some implementations, the unknown devices 125 may provide temporary, false, or otherwise unreliable device attribute information. In some implementations, the unknown devices 125 may block any form of cookie record keeping, measurement, or analysis, or may any type of temporary client-side storage of server provided information (e.g., cookies, etc.). In some implementations, the unknown devices 125 may provide incomplete (e.g., not all requested or desired attribute information available, etc.) device attribute data to the content provider 160 or the data processing system 105. Thus, the data processing system 105 may not maintain or otherwise "know" the attributes of any of the unknown devices 125. The unknown devices 125 may therefore be a part of "domain B," or a separate domain of devices for which labels (e.g., the devices attributes 175, etc.) are not known for machine-learning purposes. The unknown devices 125 may perform any of the functionality of the client devices 120 described herein above, but do not provide any attribute data (e.g., the device attributes 175, etc.) to the data processing system 105 or the content provider 160.

The content provider 160 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The content provider 160 can include one or more computing devices or servers that can perform various functions as described herein. The content provider 160 can include any or all of the components and perform any or all of the functions of the computer system 400 described herein in conjunction with FIG. 4

The content provider 160 can provide one or more information resources, which can include, or include scripts to retrieve, content (e.g., text, images, audio, videos, any combination thereof, etc.). The content provider 160 can record which client devices 120 (and which unknown devices 125, etc.) access online content items, including the time, identifiers, and attributes of client devices that access the online content. For example, the content provider 160 can maintain one or more logs of content requests that include all of the information described herein above with respect to content requests. Each logged content request can identify whether the content request was received by one of the client devices 120 or by one of the unknown devices 125. In some implementations, the content provider 160 can determine whether a request for content was transmitted by a known client device 120 or an unknown device 125 by the presence of a client device identifier. For example, if a content request includes an identifier of a device that is associated with one or more device attributes maintained by at least one of the content provider 160 or the data processing system 105, the content provider 160 can determine that the content request was transmitted by one of the client devices 120. In some implementations, the content provider 160 can determine that a content request was transmitted by a client device 120 if the content request includes device attributes 175. Otherwise, if the content request does not include a device identifier associated with device attributes, or if the content request does not include any device attributes, the content provider 160 can determine that the content request was transmitted by an unknown device 125.

The content provider 160 can provide content in response to one or more requests for content from client devices. For example, a client device 120 or an unknown device 125 can request an information resource from the content provider 160, and the content provider can provide the information resource to the respective device for display. The information resource can be a webpage, application resource or page, video, image, or any other type of content as described herein. An information resource provided by the content provider 160 can include one or more scripts, that when executed by the client device 120 or the unknown device 125, cause the client device 120 or the unknown device 125 to request additional content for insertion into the information resource. Thus, the content provider 160 can provide content in response to recorded content requests received from the client devices 120 or the unknown devices 125. In some implementations, the data processing system 105 can be, or perform the same functionality as, the content provider 160. In some implementations, the content provider 160 can transmit one or more of the content requests, including the indication of whether the content request was transmitted by a client device 120 or an unknown device 125. In some implementations, the content provider 160 can provide one or more content requests to the data processing system 105. In some implementations, the content provider 160 can provide any device attributes 175 received extracted from content requests received from client devices 125 to the data processing system 105.

The database 115 can be a database configured to store and/or maintain any of the information described herein. The database 115 can maintain one or more data structures, which can contain, index, or otherwise store each of the values, pluralities, sets, variables, vectors, or thresholds described herein. The database 115 can be accessed using one or more memory addresses, index values, or identifiers of any item, structure, or region maintained in the database 115. The database 115 can be accessed by the components of the data processing system 105, or any other computing device described herein, via the network 110. In some implementations, the database 115 can be internal to the data processing system 105. In some implementations, the database 115 can exist external to the data processing system 105, and can be accessed via the network 110. The database 115 can be distributed across many different computer systems or storage elements, and can be accessed via the network 110 or a suitable computer bus interface. The data processing system 105 can store, in a region of memory in the data processing system 105, or in the database 115, the results of any or all computations, determinations, selections, identifications, generations, constructions, or calculations in one or more data structures indexed or identified with appropriate values. Any or all values stored in the database 115 can be accessed by any computing device described herein, such as the data processing system 105, to perform any of the functionalities or functions described herein.

The database 115 can store or otherwise maintain one or more requests 170, and one or more unknown requests 180. As described herein above, the requests 170 can be requests for content or for information resources received from client devices 120. In some implementations, when the content provider 160 receives a content request from a client device 120, the content provider 160 can store and forward the content request, and any associated attribute data (e.g., the attributes 175, etc.), to the data processing system 105. In some implementations, the content provider can store the requests 170 and any device attributes 175 directly in the database 115. The requests 175 can include an identifier of the requested content, a location identifier of requested content (e.g., a uniform resource identifier (URI), etc.), an identifier of a location of the client device 120 (e.g., country, global positioning system (GPS) coordinates, etc.), and contextual information, such as text information, image information, metadata, script information, from an information resource (e.g., the information resource or application resource that includes instructions causing the client device to transmit the request for content, etc.) being displayed on the client device 120. The requests for content transmitted by a client device 120 can include a timestamp that identifies the time the request for content was transmitted, a network domain accessed by the client device 120, category information about an information or application resource accessed by the client device, and information about interactions performed on the client device 120, among others. In some implementations, the requests for content can be hypertext transfer protocol (HTTP) requests, file transfer protocol (FTP) requests, hypertext transfer protocol secure (HTTPS) requests, file transfer protocol secure (FTPS), or any other type of request that can cause the client device 120 to request access to content via the network 110. The requests 175 can be stored in association with one or more device attributes 175 of the corresponding client device 120 that transmitted the request.

The unknown requests 180 can include similar data items, but instead of being transmitted by the client devices 120, the unknown requests 180 can be transmitted by the unknown devices 125. Because the unknown devices 125 do not necessarily provide device attributes 175 of the unknown devices 125, the data processing system 105 may not maintain or store a complete record of the device attributes 175 for the unknown devices 125. Thus, as indicated in the system 100, the unknown requests are not necessarily stored in association with complete device attributes 175, and when device attributes 175 are required for a process (e.g., content selection, etc.), the device attributes can be determined using the attribute classifier 150 as described herein.

The device attributes 175 can be stored in the database 115 in one or more data structures. In some implementations, the data structures storing the device attributes 175 can be stored in association with a device identifier that identifies a device associated with the respective device attributes. The device attributes 175 can include information about a particular device, for example, display capability (e.g., display size or resolution, etc.), display format compatibility (e.g., ability to display certain content due to software limitations, etc.), processing capability to process and display certain content (e.g., presenting content that does not hinder client device performance in a meaningful way, etc.), operating system type, a web browser identifier, an application identifier, expected browsing history or behavior of the device, among others. The device attributes 175 can be stored with one or more respective content requests 170, which can also identify a respective client device 120 that is associated with the device attributes. Computing devices that select and provide content to client devices 120, such as the data processing system 105 or the content provider 160, can use the device attributes 175 to select content that is relevant or tailored to a particular client device 120. Because the unknown devices 125 generally do not provide access to device attributes 175 that are associated with the unknown devices 125, the content provider 160 or the data processing system 105 can use the device classifier to predict the device attributes 175 of the unknown devices 125 using the attribute classifier 150. Once classified, the predicted device attributes of the unknown devices 125 can be used to select content for the unknown devices 125 in response to one or more content requests.

Referring now the operations of the data processing system 105, the request maintainer 130 can maintain one or more requests 170 for content from one or more client devices 120 (e.g., representing "domain A" of devices). The request maintainer 130 can store the requests 170 in one or more data structures that store information in computer memory. If a request 170 is a content request transmitted by a client device 120, the request maintainer 130 can store the request 170 in association with one or more device attributes 175 of the client device 120 making the request. For example, the request maintainer 130 can extract a client device identifier from the request, and access the database 115 to identify device attributes 175 that are stored in association with that identifier. In some implementations, a request 170 can include one or more device attributes 175 of the client device 120 that requests content. The request maintainer 130 can receive messages from client devices 120, such as requests for content, and can extract from the messages one or more requests 170 (e.g., the URI and any associated request attributes as descried herein, other request data described herein, etc.) or device attributes 175 of the client device. The request attributes can include information included in a particular request, for example, an identifier of the requested content, a location identifier of requested content (e.g., a URI, etc.), an identifier of a location of the client device 120 making the request (e.g., country, global positioning system (GPS) coordinates, etc.), and contextual information, such as text information, image information, metadata, or script information from an information resource (e.g., the information resource or application resource that includes instructions causing the client device to transmit the request for content, etc.) being displayed on the client device 120. The request attributes can include a timestamp that identifies the time the request for content was transmitted, a network domain accessed by the client device 120, category information about an information resource or an application resource accessed by the client device 120, and information about interactions performed on the client device 120, among others.

The request maintainer 130 can generate a data structure (e.g., in the memory of the data processing system 105, etc.), to store the request 170 and the device attributes 175 (if present) received from a client device 120. The data structure can then be stored the database 115. Each of the data structures stored by the request maintainer 130 can be associated with a location, address, or pointer to a location in the database 115 at which the respective data record resides. Using the location of the data record, the request maintainer 130 (e.g., or any other component of the data processing system 105) can access the data structures, and the requests 170 or the device attributes 175 included therein. In some implementations, the request maintainer 130 stores the data structures (e.g., the requests 170 and the device attributes 175, or any other data, etc.) in the memory of the data processing system 105.

The request maintainer 130 can maintain one or more unknown requests 180 for content transmitted by one or more unknown devices 125 (e.g., representing "domain B" of devices). Similar to the requests 170, the request maintainer 130 can store the unknown requests 180 in one or more data structures that store information in computer memory. However, as the unknown requests 180 are transmitted by the unknown devices 125, any device attributes 175 associated with the unknown devices 125 may be incomplete or unavailable. The request maintainer 130 can store or identify which, if any, of the device attributes 175 of the unknown device 125 that are provided in the unknown request 180. The request maintainer can store the unknown request 180 in one or more data structures including any available device attributes of the unknown device 125, along with an indication of which items of the device attributes 175 are missing for the unknown device 125 that provided the unknown request 180.

The request maintainer 130 can receive messages from unknown devices 125, such as requests for content, and can extract from the messages one or more unknown requests 180 (e.g., the URI and any associated request attributes as descried herein, other request data described herein, etc.) or device attributes 175 of the client device. The request attributes can include any information included in a particular request for content, including an identifier of the requested content, a location identifier of the requested content (e.g., a URI, etc.), an identifier of a location of the unknown device 125 making the request (e.g., country, global positioning system (GPS) coordinates, etc.). The unknown request 180 can include contextual information, such as text information, image information, metadata, or script information from an information resource (e.g., the information resource or application resource that includes instructions causing the unknown device 125 to transmit the request for content, etc.) being displayed on the unknown device 125. The request attributes can include a timestamp that identifies the time the request for content was transmitted, a network domain accessed by the unknown device 125, category information about an information resource or an application resource accessed by the client device 120, and information about interactions performed on the client device 120, among others.

The request maintainer 130 can generate a data structure (e.g., in the memory of the data processing system 105, etc.), to store the request 170 and the device attributes 175 (if present) received from a client device 120. The data structure can then be stored the database 115. Each of the data structures stored by the request maintainer 130 can be associated with a location, address, or pointer to a location in the database 115 at which the respective data record resides. Using the location of the data record, the request maintainer 130 (e.g., or any other component of the data processing system 105) can access the data structures, and the requests 170 or the device attributes 175 included therein. In some implementations, the request maintainer 130 stores the data structures (e.g., the requests 170 and the device attributes 175, or any other data, etc.) in the memory of the data processing system 105.

In some implementations, the request maintainer 130 can receive any of the requests 170, the device attributes 175, or the unknown requests 180 via the content provider 160. For example, the content provider can receive a request 170 for content from a client device 120, or an unknown request 180 for content from an unknown device 125. The content provider 160 can log the requests or the attributes (e.g., in the memory of the content provider 160 as described herein above, etc.), and transmit, or forward, the requests or the attributes to the data processing system 105 via the network 110. The request maintainer 130 can receive the forwarded requests 170, attributes 175, or unknown requests 180, and store them in one or more data structures in the database 115 as described herein above. In some implementations, the request maintainer 130 can receive some device attributes 175 that correspond to the unknown devices 125. For example, the device attributes 175 for unknown devices 125 may be incomplete information. In some implementations, complete device attributes 175 may be available for some of the unknown devices 125, but not all of the unknown devices 125 that represent the target "domain B" of unknown devices 125. In such implementations, the complete attribute data for some of the unknown devices 125 can be utilized in training a classification model for the "domain B" of client devices.

The model trainer 135 can be configured to train a model that can predict the device attributes 175 of a client device 120 or an unknown device 125. As detailed above, because the client devices 120 and the unknown devices 125 are of different machine-learning domains (e.g., "domain A" and "domain B"), a model trained on the known source dataset received from the client devices 120 (e.g., the requests 170 as input data and the device attributes 175 as known labels, etc.), may not perform as expected on the target unknown dataset (e.g., the unknown requests 180). To solve this problem, the model trainer 135 can utilize the other components of the data processing system 105 to perform one or more domain adaptation techniques during the training of the classification model. Thus, the final classification model can be used by the attribute classifier 150 to accurately classify (e.g., predict, estimate, etc.) the device attributes of the target unknown dataset, in this case the unknown requests 180.

To train a classification model, the model trainer 135 can use one or more supervised learning techniques on labeled input data. The input data can be the requests 170 received from the client devices 120. As the client devices 120 have known device attributes 175, the known device attributes 175 stored in association with the requests 170 can be used as the labels during model training. The classification model can be a neural network, such as a multi-layer perceptron network (e.g., a fully connected network, a sparsely connected network, etc.), a convolutional neural network, a recurrent neural network, a deep neural network with many layers, or any combination thereof. In some implementations, the size of the input layer of the classification model can be selected to match the size or dimensionality of the requests 170 used as input data, and the size of the output layer selected to match the size or dimensionality of the known device attributes 175 used as labels. The model trainer 135 can encode each request 170 as an item of training data, for example as a vector or as another type of data structure, such as a tensor. The encoded training data can be stored in association with a known label, which can be an encoded form of the known device attributes 175 that correspond to a particular request 170.

In some implementations, the model trainer 135 can generate the structure of the classification model used to predict the device attributes based on request input data. Structural aspects of the classification model can include the dimensionality of the input layer, the number of and types of the layers in the classification model, the number and type of neurons in each layer, the size or dimensionality of the output layer, and the connections between the neurons in each layer (which can be associated with corresponding weight values or bias values), among others. To generate the classification model, the model trainer 135 can allocate one or more data structures in the memory of the data processing system 105 for the layers in the classification model, and any associated weight values, bias values, or function parameters associated with the classification model.

Using the input data from the requests 170, the model trainer 135 can select or identify training data to use in training the model. As the domain adaptation techniques used to train the classification model utilize both the requests 170 and the unknown requests 180, the model trainer 135 can identify the requests 170, device attributes 175, and unknown requests 180 to use as training data. In some implementations, the model trainer 135 can identify an equal number of requests 170 and unknown requests 180 for use in training the classification model. In some implementations, the model trainer 135 can identify an unequal number of requests 170 and unknown requests 180, where the relative proportion of requests 170 to unknown requests 180 in the training data is specified as a predetermined parameter. Once the training data (e.g., the requests 170 and unknown requests 180, etc.) has been identified for use in training the model, the model trainer 135 can train the classification model using a backpropagation technique.

In brief overview, backpropagation is the process of determining the difference (or loss) between the output value of the neural network (e.g., the output value(s) of the output layer) and an expected ground truth output (e.g., the device attributes 175 associated with an input request 170, etc.). After the data processing system determines the value of the loss function, the data processing system can use a backpropagation algorithm to adjust the weights and biases of the classification model to result in an output that minimizes the loss function. In domain adaptation techniques, additional factors are added to the loss function during the minimization process to adjust how the model is trained based on differences in the data of the source domain and the data of the target domain. Such techniques are described in detail herein below.

To determine the loss for one or more items of training data, the model trainer 135 can propagate a request 170 (e.g., the request attributes included in the request as described herein above, etc.) the model to generate internal model information. This internal data can be intermediate data that is generated at each layer of the classification model. When determining the loss for the network, some internal data can be used to compensate for the differences in the source domain (the device attributes 175 associated with the requests 170, etc.) and the target domain (the device attributes of unknown devices 125 that transmitted the unknown requests 180, etc.). In some implementations, the output of the classification model (e.g., the value provided at the output layer, etc.) can be used as the internal data for purposes of determining the adjustment term for the loss function used in the domain adaptation techniques described herein.

Likewise, the model trainer 135 can propagate the unknown requests 180 through the model to generate second internal. Propagating data such as the requests 170 or the unknown requests 180 through the classification model can include applying each parameter (sometimes referred to as a request attribute) of the corresponding request to an input location of the classification model. The input location can be, for example, an input location or neuron in an input layer of the classification model. Each neuron, or other type of neural network structure, in the layer that follows the input layer can take one or more items of information from the input layer as an input, and the model trainer 135 can perform processing on that item of input information in accordance with that neuron. For example, in the case where the neuron is a perceptron, the model trainer can perform the following computation on the input layer to produce an output value:

$$y = f(\Sigma_{i=0}^{N} w_i x_i + b) \tag{8}$$

where y is the output value of the neuron, $w_i$ is weight value for the corresponding value in the previous layer xi, b is the bias value of the neuron, and N is the number of neurons in the preceding layer. The function $f$ can be an activation function, which can include a sigmoid function, a hyperbolic tangent function, a sign function, or a step function, among others. When different neurons are used, the computation according to the type of neuron can change. For example, in a recurrent neural network, a previous output can be used as an input to the current input values of the network. Convolutional neural networks can perform one or more convolution operations on the input data structure created by the network layer. It should be appreciated that any type of neural network structure with learnable parameters can be utilized with the domain adaptation techniques described herein.

The model trainer 135 can propagate any input data (e.g., the parameters of a request 170 or the parameters of an unknown request 180, etc.) through each layer of the classification model until an output layer is reached. The model trainer 135 can compute the final output of the output layer to arrive at an output data structure. The output data structure can be, for example, an output vector, an output tensor, or any other type of data structure that can be generated as an output of a neural network. The output value generated by the classification model can be a prediction of the device attributes of a device that transmitted the corresponding input request (e.g., the request 170 or the unknown request 180). The loss of the classification model can be computed using the output value, in part by comparing the output value to an expected output of the model (e.g., the device attributes 175 corresponding to the request used as input, etc.).

To determine the loss of the classification model based on the requests (e.g., the requests 170 and the unknown requests 180, etc.) used as an input to the classification model, the internal data extractor 140 can extract internal data for use in a domain adaptation technique. As described herein above. For example, in a maximum mean discrepancy implementation, the classification model can first be trained as described herein on the known training dataset (e.g., the requests 170 as input and the device attributes 175 associated with those requests as labels, etc.). Next, the loss function can be "tuned," or adjusted, based on information generated from unknown requests 180 that are associated with corresponding device attributes 175 of unknown devices 125 in the target domain (e.g., "domain B"). Note that maximum-mean-discrepancy implementations require that the data used to adjust the model for the target model is associated with known labels. In circumstances where no labels are available, other domain adaptation techniques can be used. Thus, the data processing system 105 can select the type of domain adaption to perform (e.g., one of those techniques as described herein, etc.) based on the presence or absence of labeled data for the target domain (e.g., known device attributes 175 of unknown devices 125).

In a maximum-mean-discrepancy implementation, the internal data extractor 140 can extract internal data from each of the layers on which the maximum-mean-discrepancy training is to be performed. The layers on which the maximum-mean-discrepancy will be performed can be predetermined layers, or layers indicated in one or more configuration settings. First, a subset of the data in the known training dataset (the requests 170 and corresponding device attributes 175) can be selected (e.g., as a mini-batch, etc.), and propagated through the network. Then, for each item of training data, the internal data extractor 140 can extract the output of each hidden layer in the classification model on which the maximum-mean-discrepancy techniques are to be applied. These values can be stored in respective sets $D_S^l$, where $D_S$ is the set of internal data for each item in the mini-batch for the source domain S, and the identifier l identifies from which layer in the neural network the respective set $D_S$ was extracted. The extraction process can include copying the information (e.g., the output data structure of a layer, etc.) to another location in computer memory (e.g., the memory of the data processing system 105, the database 115, etc.). The internal data extractor 140 can repeat the same process for the target dataset (e.g., a subset or mini-batch of the unknown requests 180 and corresponding device attributes 175, etc.). When extracting information from the target dataset, similar datasets $D_T^l$ can be extracted, where $D_T$ is the set of internal data for each item in the mini-batch for the target domain T, and the identifier/identifies from which layer in the neural network the respective set $D_T$ was extracted.

The internal data extractor 140 can determine from which layer of the classification model to extract the internal data based on which domain adaptation technique is selected (e.g., by the data processing system 105, or by a predetermined configuration file, etc.) to train the model. In a CORAL implementation, the internal data extractor 140 can extract data to calculate the CORAL loss for the model. As described herein above, the CORAL loss can be calculated based on both the source domain (e.g., client devices 120 of "domain A") and the target domain (e.g., unknown devices 125 of "domain B") with requiring labels for the information in the target domain. In a CORAL implementation, the internal data extractor 140 can maintain two copies of the classification model used to predict device attributes based on input data. An example implementation of a CORAL implementation is depicted in FIG. 2.

Figure 2:
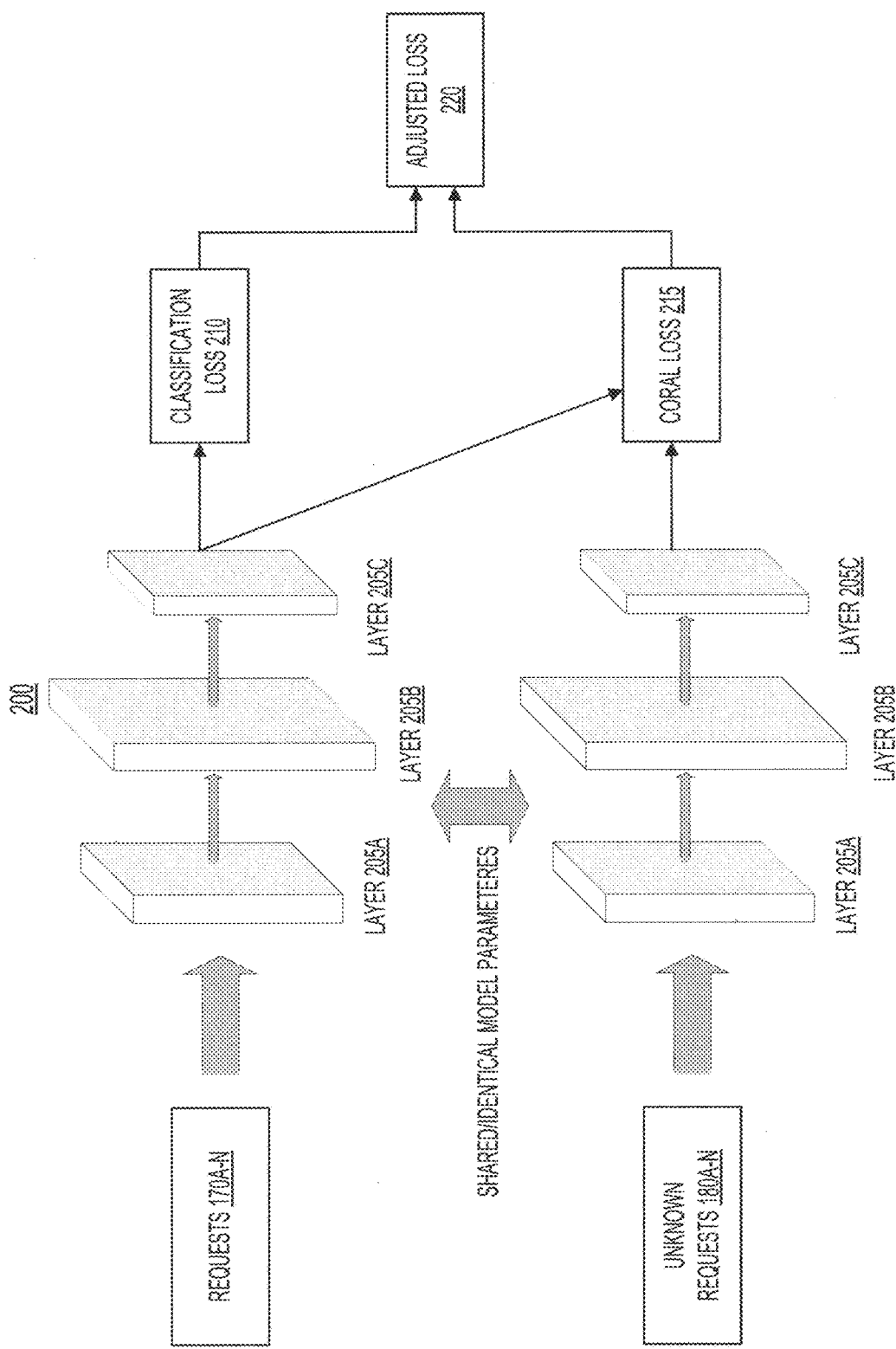
FIG. 2 illustrates a diagram of extracting and comparing intermediate values of a neural network model.

Referring briefly now to FIG. 2, depicted is a block diagram 200 of a CORAL loss implementation to train a classification model for device attributes 175 based on content requests. As depicted in FIG. 2, the model is copied, or replicated, such that information from the target domain (e.g., the unknown requests 180) and information from the source domain (e.g., requests 170) can each propagate through the each of the layers 205A-C of the classification model. Although there are only three layers 205A-C depicted in the classification model in the diagram 200, it should be understood that any number of layers, or any type of layer, could be used as part of the classification model. As depicted in the figure, the CORAL loss is computed based on the final layer of the network. However, as described herein below in conjunction with the loss calculator 245 of system 100, the CORAL loss can be calculated for any number of layers in the network. The CORAL loss 215 can be similar to the CORAL loss described herein above and in further detail below, and can be combined with the classification loss 210 (e.g., cross-entropy loss determined as part of backpropagation, etc.) to arrive at a final adjusted loss value. The adjusted loss 220 can be used in conjunction with a backpropagation algorithm to update the weights, biases, or other learnable parameters of the classification model until the classification model can accurately classify the unknown requests 180 of the target domain and the requests 170 of the source domain.

Referring back now to FIG. 1, in a CORAL loss implementation, the internal data extractor 145 can replicate a model prior to training as shown in FIG. 2. As the model weights are updated, the same updates can be applied to each copy of the model such that the models have shared learnable parameters, such as weights, biases, or other values. The internal data extractor 145 can perform similar selection steps to identify training data in the source domain (e.g., requests 170 as input, device attributes 175 as labels, etc.) and data in the target domain (e.g., unknown requests 180 as input, no labels) to train the classification model. The internal data extractor 145 can then select which layers of the classification model to utilize in the CORAL loss determination. The layers of the classification model can be selected based on one or more predetermined parameters, such as a configuration file. In some implementations, the selection of which layers of classification model from which to determine the CORAL loss can be received from an external computing device via the network 110.

For each mini-batch, or selected group of data (e.g., for each of the requests 170 and the requests 180, etc.), the internal data extractor can extract the internal outputs of each layer selected for use in determining the CORAL loss. These internal datasets can be stored in one or more data structures of the data processing system 105, and can be associated with an indication of the training data from which the internal data was generated. The data structures storing the internal data for use in computing the CORAL loss for the model can be accessed by other components of the data processing system 105 for further processing.

In a reverse gradient implementation, the internal data extractor 140 can extract information from a selected layer, which as described above can be selected based on an internal configuration setting or based on information received from an external computing system via the network 110. As described herein above, the reverse gradient implementation includes propagating information through a separate classifier in parallel to the classification model undergoing training. As the classification model is trained, the internal data extracted by the internal data extractor 145 can be used as an input to a parallel model that is trained in parallel with the classification model (e.g., at the same time, or as the classification model is trained, etc.). The parallel model is trained using similar backpropagation techniques to predict whether the input data (e.g., the request input to the classification) was selected from the target domain or the source domain. When training the parallel model, the value of the loss of the parallel model is propagated backwards (e.g., backpropagation, etc.) through a "reverse gradient" layer, and applied to the classification model, as described herein below in conjunction with the loss calculator 145.

The loss calculator 145 can determine a difference between the internal data generated by the input data from the source domain (e.g., the requests 170) and the internal data generated by the input data of the second domain (e.g., the unknown requests 180). In particular, the loss calculator 145 can calculate the difference of the internal data by calculating a loss for the classification model using the selected domain adaptation technique. As described herein above, the selected domain adaptation technique can be selected using an internal configuration setting (e.g., a predetermined selection, etc.) or from a selection received by the data processing system 105 from an external computing device via the network 110. Loss functions can be used to determine the amount by which the learnable parameters of the classification model should be adjusted based on the difference between an expected output value and the value output by the classification model in response to an input. Domain adaption introduces additional terms to the loss function computation that adjust the loss function such that the internal representations of the input data from the source domain and the target domain are similar. Different domain adaptation techniques can adjust the loss function differently, as described herein below.

In a maximum mean discrepancy implementation, the loss calculator 145 can calculate the adjustment term for loss function using by computing the formula below:

$$\lambda \Sigma_{l=l_1}^{l_2} d_k^2(D_S^l, D_T^l) \qquad (9)$$

where $l_1$, $l_2$ indicate the layer indices between which the regularizer is used (as mentioned above, usually later layers of the model) and $d_k^2(D_S^l, D_T^l)$ can be the MK-MMD between the source and target distributions evaluated at the l-th layer of the model. As described herein above, the values of $D_S^l$ and $D_T^l$ were extracted by the internal data extractor 140 for mini-batches of the requests 170 and the unknown requests 180. The factor $\lambda$ can be a model parameter and can be predetermined, or can be received from an external computing device via the network 110.

The adjustment value for the loss function computed above can be combined with the loss function that would be used in training the classification model without domain adaptation, such as a mean squared error, mean squared logarithmic error, mean absolute error, binary cross-entropy, hinge-loss, or squared hinge loss, among others. Thus, the final loss function optimized for the function f over the input data x can be computed as:

$$\frac{1}{n}\sum_{i=1}^{n} L(x, y, f) + \lambda \sum_{l=l_1}^{l_2} d_k^2(D_S^l, D_T^l) \qquad (10)$$

In a CORAL domain adaptation implementation, the loss calculator 145 can determine a CORAL loss (e.g., the CORAL loss 215 described above in conjunction with FIG. 2, etc.) based on the differences in the internal representations of the source domain and the internal representation of the target domain. Thus, the loss calculator 145 can minimize domain shift by aligning the second-order statistics of source and target distributions, without requiring any target labels (e.g., device attributes associated with the requests. During training, CORAL loss is added to minimize the difference in the covariance of learned features across domains. The CORAL loss can be computed as:

$$\frac{1}{4d^2}\|C_S - C_T\|_F^2 \qquad (11)$$

The CORAL loss expression above can measure the differences in the covariance between the learned features from the source and target data in the model's output from the source and target domains ($C_S$ and $C_T$, respectively) which can be defined by computing the following:

$$C_S = \frac{1}{n_s - 1}\left(D_S^T D_S - \frac{1}{n_s}(1^T D_S)^T(1^T D_S)\right) \qquad (12)$$

$$C_T = \frac{1}{n_{T-1}}\left(D_T^T D_T - \frac{1}{n_T}(1^T D_T)^T(1^T D_T)\right) \qquad (13)$$

where 1 is a column vector with all elements equal to 1, $D_S$ represents a set of d-dimensional deep layer activations of an input $I_S$ from the source domain, $D_T$ represents a set of d-dimensional deep layer activations of an input $I_T$ from the target domain, and ns and $n_T$ represent the number of source and target data, respectively. As described herein above, values for $D_S$ and $D_T$ can be extracted by the internal data extractor 145.

Once the CORAL loss has been calculated, the loss calculator can calculate the overall loss function to be minimized by computing the following:

$$\sum_i L(x, y, f) + \frac{1}{4d^2}\|C_S - C_T\|_F^2 \qquad (14)$$

As above, the first term of the loss function can be the loss function that would be used to train the classification model without domain adaptation.

In a reverse gradient approach, the loss calculator 145 can calculate the adjustment to the loss function by propagating an adjustment factor through a "reverse gradient layer". As described above, a reverse gradient implementation trains an additional model in parallel with the classification model that classifies the domain from which the input data was selected (e.g., the source domain or the target domain, etc.). Using a back-propagation technique, the loss function for the parallel model can be represented as:

$$\Sigma_i L_d(f, x) \qquad (15)$$

When the loss calculator 145 computes the value of the loss function for the classification model, the loss calculator 145 can adjust the loss function of the classification model by passing the loss of the parallel model through a reverse gradient model, thus arriving at the following term:

$$-\lambda \Sigma_i L_d(f, x) \qquad (16)$$

where $\lambda$ can be a predetermined coefficient (e.g., stored as a configuration setting, etc.), or received from an external computing device via the network 110.

The reverse gradient loss function above can be combined with the loss function of the classification model when the loss is propagated backwards (e.g., backpropagation, etc.) through each of the layers from which the internal data was extracted by the internal data extractor 145 for the parallel model. For example, if the internal data extractor 145 extracted internal data from the third layer of the model as an input to the domain classification model, the reverse gradient loss can be applied to the third layer of the classification model, and to the layers the precede the third layer of the classification model. The loss function value computed by the loss calculator 145 for those layers can thus be:

$$\Sigma_f L(x,y,f) - \lambda \Sigma_f L_d(f,x) \tag{17}$$

Once, the loss calculator 145 has calculated the loss for the layers in the classification model, the model trainer 135 can perform a back-propagation technique to minimize the loss function, including any adjustment factors imposed by the domain adaptation techniques described above, across the layers of the classification model. For example, the model trainer 135 can update weights or other learnable parameters of the of the model based on the difference between the first internal data and the second internal data, and a difference between the first output vector and the device attributes of the first client device. The model trainer 135 can thus can adjust the learnable parameters of the classification model based on the computed loss for each layer in the classification by using an optimization function, such as gradient descent, stochastic gradient descent, or mini-batch gradient descent, among others.

The optimization function can output a change in the learnable parameters (e.g., the weights values and bias values, etc.) to minimize the loss function in that layer. The amount by which the learnable parameters are changed can be multiplied by a learning rate factor. The learning rate factor, as well as the type of loss function or optimization function used, can be specified in a predetermined configuration file or received from an external computing device via the network 110. The components of the data processing system 105 can perform the training operations described herein above using a selected domain adaptation technique until the classification model reaches a predetermined training condition. In some implementations, the training condition can be an accuracy condition that indicates the classification model can train the model until it can accurately predict the device attributes 175 of a request 170 to a predetermined amount of accuracy (e.g., correct prediction 90% of the time, 95% of the time, 99% of the time, etc.). In some implementations, the training condition can include training the model until all of the selected training data (e.g., the requests 170 and the unknown requests 180) have been propagated through the classification model. Once trained, the model trainer 135 can store the classification model (e.g., including all learned parameters, etc.) in one or more data structures in the memory of the data processing system 105.

Following training, the attribute classifier 150 can classify (e.g. predict) device attributes of an unknown device 125 that provided an unknown request 180 for content. As unknown devices 125 may not provide device attribute data for content selection, the attribute classifier 150 can predict the device attributes using the classification model trained by the components of the data processing system 105. When the data processing system 105 receives an unknown request 180, the attribute classifier 150 can extract the request attributes from the unknown request 180 and encode those request attributes into an input data structure for the trained classification model. The attribute classifier 150 can propagate (e.g., solve the computations for each neuron in each layer, and provide the output of each layer as an input to the next layer, etc.) the encoded unknown request 180 data through the classification model to compute a final output data structure. The output data structure can represent an encoded form of the predicted device attributes of the unknown device 125 that provided the unknown request 180.

Using the predicted device attributes, the data processing system 105 can select content to provide the unknown device 125 using a content selection policy. For example, the data processing system 105 can access content that is technically compatible with or relevant to the predicted device attributes (e.g., content having display characteristics that that match the technical aspects of the device, content having information that is associated with attributes similar to the predicted device attributes, etc.). The content selection policy can select content that is requested by the unknown device 125 that is technically suitable for the unknown device 125 based on the predicted attributes. For example, if the predicted device attributes indicate that the unknown device can display content with a resolution of 1920×1080, the data processing system 105 can provide content having said resolution. Similarly, if the predicted device attributes indicate that the unknown device 125 is incapable of displaying a video with a framerate that is more than thirty frames per second, the data processing system 105 can select content with a framerate that meets that requirement. Thus, the data processing system 105 can select content that is technically suited for the unknown device 125, and is personalized to the corresponding unknown device 125, even though the unknown device may not provide or transmit any device attributes 175.

After selecting the content to provide to the unknown device 105, the data processing system 105 can transmit the selected content to the unknown device 125 that transmitted the unknown request 180. The content can be transmitted in one or more response messages via the network 110. In situations where the device attributes 175 are known for a device that transmits a request for content to the data processing system 105, the data processing system 105 can select content using the known device attributes 175. Likewise, if the device attributes of an unknown device 125 are partially known (e.g., incomplete device attributes 175, etc.), the portions of the device attributes 175 that are known can be used in conjunction with predicted portions device attributes in content selection. That is, predicted device attributes can be used to provide an input to a content selection process when that input would be otherwise unavailable or unknown.

Figure 3:
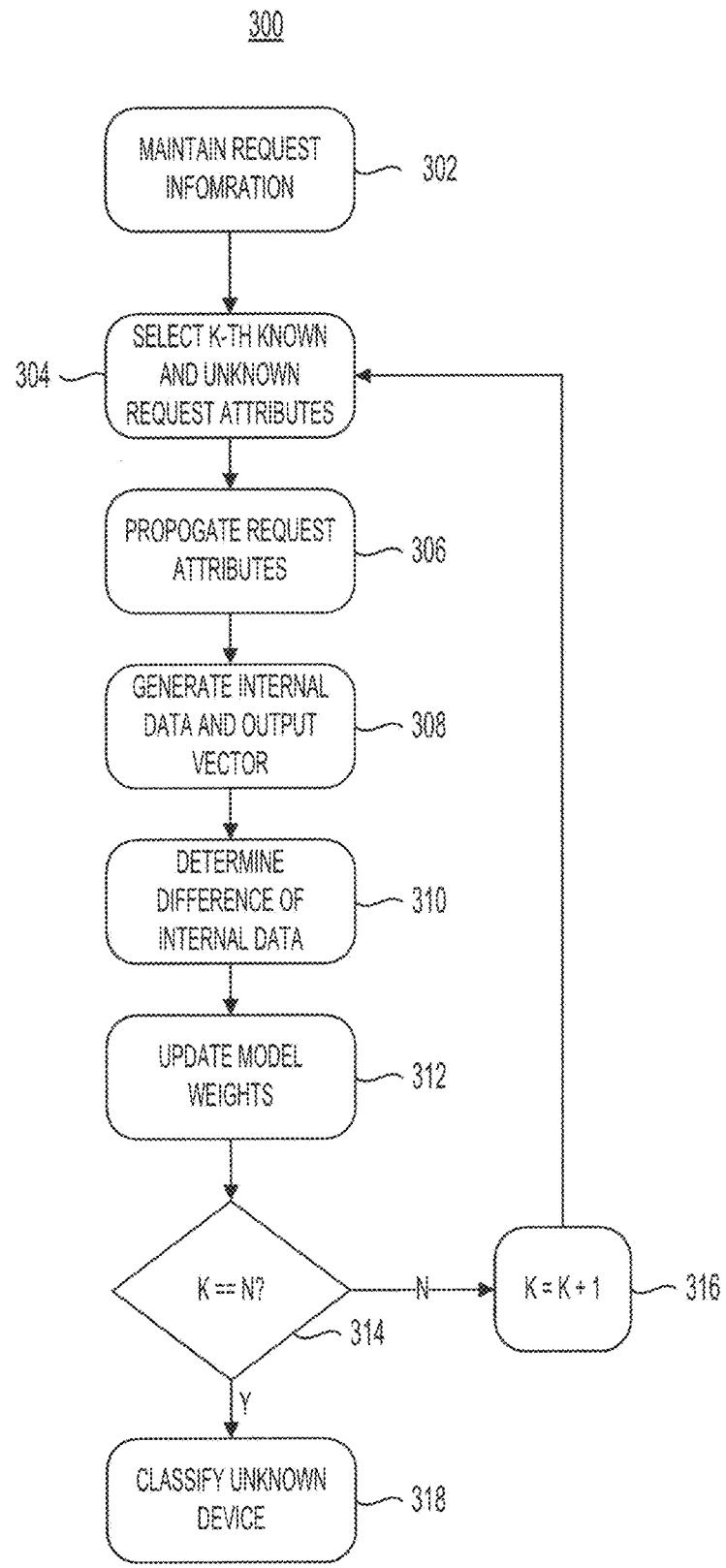
FIG. 3 illustrates an example flow diagram of a method for training a model using cross-domain adaptation to classify content requests from client devices having unknown attributes.

Referring now to FIG. 3, depicted is an illustrative flow diagram of a method 300 for training a model using cross-domain adaptation to classify content requests from client devices having unknown attributes. The method 300 can be executed, performed, or otherwise carried out by the data processing system 105, the computer system 400 described herein in conjunction with FIG. 4, or any other computing devices described herein. In brief overview, the data processing system (e.g., the data processing system 105, etc.) can maintain request information (STEP 302), select the k-th known and unknown request attributes (STEP 304), propagate request attributes (STEP 306), generate internal data and an output vector (STEP 308), determine the difference of internal data (STEP 310), update model weights (STEP 312), determine whether the counter register k is equal to the amount of training data n (STEP 314), increment the counter register k (STEP 316), and classify an unknown device (STEP 318).

In further detail, the data processing system (e.g., the data processing system 105, etc.) can maintain request information (STEP 302). For example, the data processing system can maintain one or more requests (e.g., the requests 170)

for content from one or more client devices (e.g., a client device 120 representing "domain A" of devices). The data processing system can store the requests in one or more data structures that store information in computer memory. If a request is a content request transmitted by a client device, the data processing system can store the request in association with one or more device attributes (e.g., the device attributes 175, etc.) of the client device making the request. For example, the data processing system can extract a client device identifier from the request, and access a database (e.g., the database 115, etc.) to identify device attributes that are stored in association with that identifier. In some implementations, a request can include one or more device attributes of the client device that requests content. The data processing system can receive messages from client devices, such as requests for content, and can extract, from the messages, requests (e.g., the URI and any associated request attributes as descried herein, other request data described herein, etc.) or device attributes of the client device.

The request attributes can include an identifier of the requested content, a location identifier of requested content (e.g., a URI, etc.), an identifier of a location of the client device 120 making the request (e.g., country, global positioning system (GPS) coordinates, etc.), and contextual information, such as text information, image information, metadata, or script information from an information resource (e.g., the information resource or application resource that includes instructions causing the client device to transmit the request for content, etc.) being displayed on the client device 120. The request attributes can include a timestamp that identifies the time the request for content was transmitted, a network domain accessed by the client device, category information about an information resource or an application resource accessed by the client device, and information about interactions performed on the client device, among others.

The data processing system can maintain one or more unknown requests (e.g., the unknown requests 180) for content transmitted by one or more unknown devices (e.g., the unknown devices 125 representing "domain B" of devices). Similar to the requests, the data processing system can store the unknown requests in one or more data structures that store information in computer memory. However, as the unknown requests are transmitted by the unknown devices, any device attributes associated with the unknown devices may be incomplete or unavailable. The data processing system can store or identify which, if any, of the device attributes of the unknown device that are provided in the unknown request. The data processing system can store the unknown request in one or more data structures including any available device attributes of the unknown device, along with an indication of which items of the device attributes are missing for the unknown device that provided the unknown request.

The data processing system can select the k-th known and unknown request attributes (STEP 304). To train a classification model to predict device attributes, the data processing system can iteratively loop through each group (e.g., mini-batch, etc.) of training data (e.g., the requests 170 attributes and the unknown requests 180 attributes, etc.) based on a counter register k. Each group of training data can be stored and indexed in a data structure by an index value (e.g., index 0, index 1, index 2, etc.). To train the model using each group of training data, the data processing system can select the group of training data that is stored in association with an index value equal to the counter register k. If it is the first iteration of the loop, the counter register k may be initialized to an initialization value (e.g. k 0) before selecting the k-th group of training data. Accessing the training can include copying the data associated with the selected group of training data to a different region of computer memory, for example a working region of memory in the data processing system.

The data processing system can propagate request attributes (STEP 306). As described herein, the request attributes can be encoded to match an input dimensionality or size of the input layer of the classification model. The data processing system can propagate the requests and the unknown requests through the model to generate internal data for each of the requests and the unknown requests. Propagating data through the classification model can include applying each parameter (sometimes referred to as a request attribute) of the corresponding request to an input location of the classification model (e.g., as encoded information, etc.). The input location can be, for example, an input location or neuron in an input layer of the classification model. Each neuron, or other type of neural network structure, in the layer that follows the input layer can take one or more items of information from the input layer as an input, and the data processing system can perform processing on that item of input information in accordance with that neuron. For example, in the case where the neuron is a perceptron, the model trainer can perform the following computation on the input layer to produce an output value:

$$y = f(\Sigma_{i=0}^{N} w_i x_i + b) \tag{18}$$

where y is the output value of the neuron, $w_i$ is weight value for the corresponding value in the previous layer $x_i$, b is the bias value of the neuron, and N is the number of neurons in the preceding layer. The function $f$ can be an activation function, which can include a sigmoid function, a hyperbolic tangent function, a sign function, or a step function, among others. When different neurons are used, the computation according to the type of neuron can change. For example, in a recurrent neural network, a previous output can be used as an input to the current input values of the network. Convolutional neural networks can perform one or more convolution operations on the input data structure created by the network layer. It should be appreciated that any type of neural network structure with learnable parameters can be utilized with the domain adaptation techniques described herein The data processing system can generate internal data and an output vector (STEP 308). To determine the output vector (e.g., or any other type of output data structure, etc.), The data processing system can propagate any input data (e.g., the parameters of a request 170 or the parameters of an unknown request 180, etc.) through each layer of the classification model until an output layer is reached. The data processing system can compute the final output of the output layer to arrive at an output data structure. The output data structure can be, for example, an output vector, an output tensor, or any other type of data structure that can be generated as an output of a neural network. The output value generated by the classification model can be a prediction of the device attributes of a device that transmitted the corresponding input request (e.g., the request 170 or the unknown request 180). The loss of the classification model can be computed using the output value, in part by comparing the output value to an expected output of the model (e.g., the device attributes 175 corresponding to the request used as input, etc.).

Different domain adaptation techniques can use different internal data to achieve a desired result. For example, in a maximum mean discrepancy implementation, the classification model can first be trained as described herein on the known training dataset (e.g., the requests 170 as input and the device attributes 175 associated with those requests as labels, etc.). Next, the loss for the classification model can be "tuned," or adjusted, based on information unknown requests of unknown devices in the target domain. When propagating data through the classification model, the data processing system can extract the output of each hidden layer in the classification model on which the maximum-mean-discrepancy techniques are to be applied. These values can be stored in respective sets $D_S^l$, where $D_S$ is the set of internal data for each item in the mini-batch for the source domain S, and the identifier/identifies from which layer in the neural network the respective set $D_S$ was extracted. The extraction process can include copying the information (e.g., the output data structure of a layer, etc.) to another location in computer memory (e.g., the memory of the data processing system, a database, etc.). The data processing system can repeat the same process for the target dataset (e.g., a subset or mini-batch of the unknown requests 180 and corresponding device attributes 175, etc.). When extracting information from the target dataset, similar datasets $D_T$ can be extracted, where $D_T$ is the set of internal data for each item in the mini-batch for the target domain T, and the identifier/identifies from which layer in the neural network the respective set $D_T$ was extracted.

In a CORAL implementation, the internal data extractor 140 can extract data to calculate the CORAL loss for the model. As described herein above, the CORAL loss can be calculated based on both the source domain (e.g., client devices 120 of "domain A") and the target domain (e.g., unknown devices 125 of "domain B") with requiring labels for the information in the target domain. In a CORAL implementation, the data processing system can maintain two copies of the classification model used to predict device attributes based on input data. In some implementations, the data processing system can replicate a model prior to training as shown in FIG. 2. As the model weights are updated, the same updates can be applied to each copy of the model such that the models have shared learnable parameters, such as weights, biases, or other values. The data processing system can extract the internal outputs of each layer selected for use in determining the CORAL loss. These internal datasets can be stored in one or more data structures of the data processing system, and can be associated with an indication of the training data from which the internal data was generated. The data structures storing the internal data for use in computing the CORAL loss for the model can be utilized in other steps of the method 300 to determine an adjusted loss for the classification model.

In a reverse gradient implementation, the data processing system can extract information from a selected layer, which can be selected based on an internal configuration setting or based on information received from an external computing system. The data processing system can propagate information through a separate classifier in parallel to the classification model undergoing training. As the classification model is trained, the internal data extracted by the data processing system can be used as an input to a parallel model that is trained in parallel with the classification model (e.g., at the same time, or as the classification model is trained, etc.). The parallel model is trained using similar backpropagation techniques to predict whether the input data (e.g., the request input to the classification) was selected from the target domain or the source domain. When training the parallel model, the value of the loss for the parallel model is propagated backwards (e.g., backpropagation, etc.) through a "reverse gradient" layer, and applied to the classification model.

The data processing system can determine the difference of internal data (STEP 310). The difference in the input data can be, for example, an adjustment term that can be added to the loss function for the classification model to compensate for differences between the different training domains. In a maximum mean discrepancy implementation, the data processing system can calculate the loss function using by computing the formula below:

$$\lambda \Sigma_{l=l_1}^{l_2} d_k^2(D_S^l, D_T^l) \tag{19}$$

where $l_1$, $l_2$ indicate the layer indices between which the regularizer is used (as mentioned above, usually later layers of the model) and $d_k^2(D_S^l, D_T^l)$ can be the MK-MMD between the source and target distributions evaluated at the 1-th layer of the model. The values of $D_S^l$ and $D_T^l$ were extracted by the data processing system in (STEP 308) for the selected group of training data k.

The adjustment value for the loss computed above can be combined with the loss function that would be used in training the classification model without domain adaptation, such as a mean squared error, mean squared logarithmic error, mean absolute error, binary cross-entropy, hinge-loss, or squared hinge loss, among others. Thus, the final loss function optimized for the function $f$ over the input data x can be computed as:

$$\frac{1}{n}\sum_{i=1}^{n} L(x, y, f) + \lambda \sum_{l=l_1}^{l_2} d_k^2(D_S^l, D_T^l) \tag{20}$$

In a CORAL domain adaptation implementation, the loss calculator 145 can determine a CORAL loss (e.g., the CORAL loss 215 described above in conjunction with FIG. 2, etc.) based on the differences in the internal representations of the source domain and the internal representation of the target domain. Thus, the data processing system can minimize domain shift by aligning the second-order statistics of source and target distributions, without requiring any target labels (e.g., device attributes associated with the requests. During training, CORAL loss is added to minimize the difference in the covariance of learned features across domains. The CORAL loss can be computed as:

$$\frac{1}{4d^2}\|C_S - C_T\|_F^2 \tag{21}$$

The CORAL loss expression above can measure the differences in the covariance between the learned features from the source and target data in the model's output from the source and target domains ($C_S$ and $C_T$, respectively) which can be defined by computing the following:

$$C_S = \frac{1}{n_{s-1}}\left(D_S^T D_S - \frac{1}{n_s}(1^T D_S)^T(1^T D_S)\right) \tag{22}$$

$$C_T = \frac{1}{n_{T-1}}\left(D_T^T D_T - \frac{1}{n_T}(1^T D_T)^T(1^T D_T)\right) \tag{23}$$

where 1 is a column vector with all elements equal to 1, $D_S$ represents a set of d-dimensional deep layer activations of an input $I_S$ from the source domain, $D_T$ represents a set of d-dimensional deep layer activations of an input $I_T$ from the source domain, and $n_S$ and $n_T$ represent the number of source and target data, respectively. T values for $D_S$ and $D_T$ can be extracted during (STEP 308) described herein above.

In a reverse gradient approach, the data processing system can calculate the adjustment to the loss function by propagating an adjustment factor through a "reverse gradient layer". As described above, a reverse gradient implementation trains an additional model in parallel with the classification model that classifies the domain from which the input data was selected (e.g., the source domain or the target domain, etc.). Using a back-propagation technique, the loss for the parallel model can be represented as:

$$\Sigma_i L_d(f,x) \tag{24}$$

When the data processing system computes the value of the loss for the classification model, the data processing system can adjust the loss of the classification model by passing the loss function of the parallel model through a reverse gradient model, thus arriving at the following term:

$$-\lambda \Sigma_i L_d(f,x) \tag{25}$$

where $\lambda$ can be a predetermined coefficient (e.g., stored as a configuration setting, etc.). The reverse gradient loss can then be applied to the loss function of the classification model to arrive at the following loss function, which can be minimized in backpropagation:

$$\Sigma_i L(x,y,f) - \lambda \Sigma_i L_d(f,x) \tag{26}$$

The data processing system can update model weights (STEP 312). The data processing system can perform a back-propagation technique to minimize the loss function, including any adjustment factors imposed by the domain adaptation techniques described above, across the layers of the classification model. For example, the data processing system can update weights or other learnable parameters of the of the model based on the difference between the first internal data and the second internal data, and a difference between the first output vector and the device attributes of the first client device. The data processing system can thus adjust the learnable parameters of the classification model based on the computed loss for each layer in the classification by using an optimization function, such as gradient descent, stochastic gradient descent, or mini-batch gradient descent, among others. The optimization function can output a change in the learnable parameters (e.g., the weights values and bias values, etc.) to minimize the loss in that layer. The amount by which the learnable parameters are changed can be multiplied by a learning rate factor, which can be predetermined or provided to the data processing system from an external computing system.

The data processing system can determine whether the counter register k is equal to the amount of training data n (STEP 314). To determine whether all of the training data has been used to train the classification model using a domain adaptation technique, the data processing system can compare the counter register used to select each group of training data to the total number of groups of training data n. If the counter register k is not equal to (e.g., less than) the total number of groups of training data n, the data processing system can execute (STEP 316). If the counter register k is equal to (e.g., equal to or greater than) the total number of groups of training data n, the data processing system can execute (STEP 318). In some implementations, the data processing system can next execute (STEP 316) even if the counter register k is equal to, or greater than, n. For example, if a training condition has not been reached (e.g., model accuracy, number of iterations through the loop, etc.), the data processing system can set the counter register k to an initialization value (e.g., 0, etc.), and execute (STEP 316). Likewise, if the training condition is met, but the counter register k is not equal to n, the data processing system can proceed to execute (STEP 318).

The data processing system can increment the counter register k (STEP 316). To propagate each group of training data through the classification model, the data processing system can add one to the counter register k to indicate the number of groups of training data that have been propagated through the model. In some implementations, the data processing system can set the counter register k to a memory address value (e.g., location in computer memory) of a location in memory of the next group of training data. After incrementing the value of the counter register k, the data processing system can execute (STEP 304)

The data processing system can classify an unknown device (STEP 318). As unknown devices may not provide device attribute data for content selection, the data processing system can predict the device attributes using the classification model trained by the method 300. When the data processing system receives an unknown request, the data processing system can extract the request attributes from the unknown request and encode those request attributes into an input data structure for the trained classification model. The data processing system can propagate (e.g., solve the computations for each neuron in each layer, and provide the output of each layer as an input to the next layer, etc.) the encoded unknown request data through the classification model to compute a final output data structure. The output data structure can represent an encoded form of the predicted device attributes of the unknown device that provided the unknown request.

Using the predicted device attributes, the data processing system can select content to provide the unknown device using a content selection policy. For example, the data processing system can access content that is technically compatible with or relevant to the predicted device attributes (e.g., content having display characteristics that that match the technical aspects of the device, content having information that is associated with attributes similar to the predicted device attributes, etc.). Thus, the data processing system can select content that is personalized to the corresponding unknown device, even though the unknown device may not provide or transmit any device attributes. After selecting the content to provide to the unknown device, the data processing system can transmit the selected content to the unknown device that transmitted the unknown request. The content can be transmitted in one or more response messages via the network. In situations where the device attributes are known for a device that transmits a request for content to the data processing system, the data processing system can select content using the known device attributes. Likewise, if the device attributes of an unknown device are partially known (e.g., incomplete device attributes, etc.), the portions of the device attributes that are known can be used in conjunction with predicted portions device attributes in content selection. That is, predicted device attributes can be used to provide an input to a content selection process when that input would be otherwise unavailable or unknown.

Figure 4:
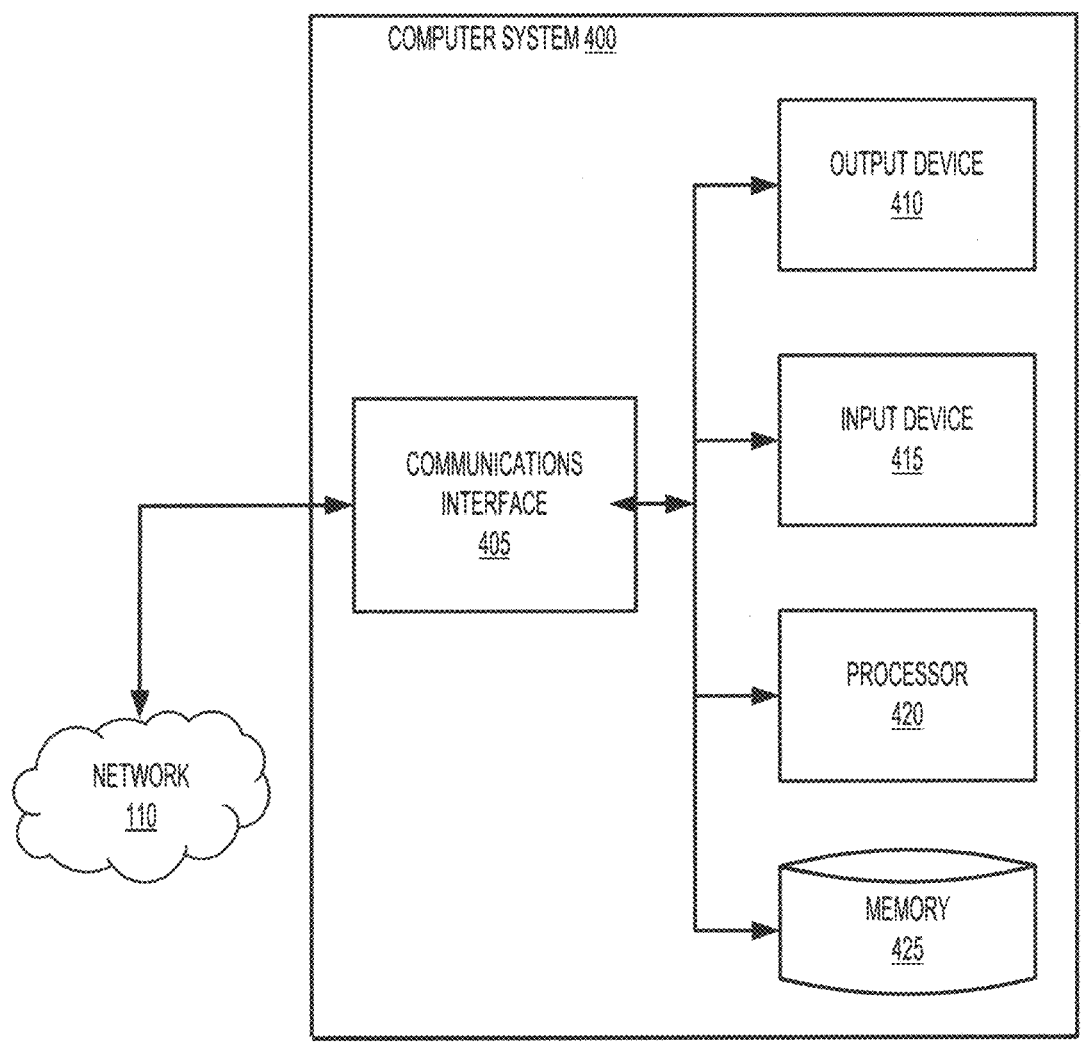
FIG. 4 illustrates the general architecture of an illustrative computer system that can be employed to implement any of the computers discussed herein.

FIG. 4 shows the general architecture of an illustrative computer system 400 that can be employed to implement any of the computer systems discussed herein in accordance with some implementations. The computer system 400 can be used to provide information via the network 110 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in any of the computing device described herein.

In the computer system 400 of FIG. 4, the memory 425 can comprise any computer-readable storage media, and can store computer instructions such as processor-executable instructions for implementing the various functionalities described herein for respective systems, as well as any data relating thereto, generated thereby, or received via the communications interface(s) or input device(s) (if present). Referring again to the system 400 of FIG. 4, the computer system 400 can include the memory 425 to store information any of the information, variables, vectors, data structures, or other computer-readable information described herein, among others. The processor(s) 420 shown in FIG. 4 can be used to execute instructions stored in the memory 425 and, in so doing, also can read from or write to the memory various information processed and or generated pursuant to execution of the instructions.

The processor 420 of the computer system 400 shown in FIG. 4 also can be communicatively coupled to or control the communications interface(s) 405 to transmit or receive various information pursuant to execution of instructions. For example, the communications interface(s) 405 can be coupled to a wired or wireless network, bus, or other communication means and can therefore allow the computer system 400 to transmit information to or receive information from other devices (e.g., other computer systems). While not shown explicitly in the system of FIG. 4, one or more communications interfaces facilitate information flow between the components of the system 400. In some implementations, the communications interface(s) can be configured (e.g., via various hardware components or software components) to provide a website as an access portal to at least some aspects of the computer system 400. Examples of communications interfaces 405 include user interfaces (e.g., web pages), through which the user can communicate with the computer system 400.

The output devices 410 of the computer system 400 shown in FIG. 4 can be provided, for example, to allow various information to be viewed or otherwise perceived in connection with execution of the instructions. The input device(s) 415 can be provided, for example, to allow a user to make manual adjustments, make selections, enter data, or interact in any of a variety of manners with the processor during execution of the instructions. Additional information relating to a general computer system architecture that can be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein can be implemented on a smart television module (or connected television module, hybrid television module, etc.), which can include a processing module configured to integrate internet connectivity with more traditional television programming sources (e.g., received via cable, satellite, over-the-air, or other signals). The smart television module can be physically incorporated into a television set or can include a separate device such as a set-top box, Blu-ray or other digital media player, game console, hotel television system, and other companion device. A smart television module can be configured to allow viewers to search and find videos, movies, photos and other content on the web, on a local cable TV channel, on a satellite TV channel, or stored on a local hard drive. A set-top box (STB) or set-top unit (STU) can include an information appliance device that can contain a tuner and connect to a television set and an external source of signal, turning the signal into content which is then displayed on the television screen or other display device. A smart television module can be configured to provide a home screen or top level screen including icons for a plurality of different applications, such as a web browser and a plurality of streaming media services, a connected cable or satellite media source, other web "channels", etc. The smart television module can further be configured to provide an electronic programming guide to the user. A companion application to the smart television module can be operable on a mobile computing device to provide additional information about available programs to a user, to allow the user to control the smart television module, etc. In alternate implementations, the features can be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what can be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. Although the examples provided can be useful for training a model using cross-domain adaptation to classify content requests from client devices having unknown attributes, the systems and methods described herein can be applied to other environments. The foregoing implementations are illustrative rather than limiting of the described systems and methods. The scope of the systems and methods described herein can thus be indicated by the appended claims, rather than the foregoing description, and changes that come within the meaning and range of equivalency of the claims are embraced therein.

What is claimed is:

1. A method, comprising:
  obtaining, by a data processing system comprising one or more processors and a memory, a first plurality of requests for content that include cookie information and first request attributes, wherein the cookie information includes device attributes of devices that submitted the first plurality of requests for content;
  obtaining, by the data processing system, a second plurality of requests that include second request attributes, but do not include the cookie information; and
  training, by the data processing system, a model, comprising:
    propagating, by the data processing system, the first request attributes of a first client device through the model to generate first internal data extracted from a layer of the model;
    generating, by the data processing system, a first output vector by propagating the first request attributes through the model to an output layer;
    propagating, by the data processing system, the second request attributes of a second client device through the model to generate second internal data extracted from the layer of the model;
    determining, by the data processing system, a difference between the first internal data and the second internal data;
    updating, by the data processing system, weights of the model based on the difference between the first internal data and the second internal data, and a difference between the first output vector and the device attributes of the first client device:
  after training the model, receiving a new content request that includes corresponding request attributes, but does not include corresponding cookie information; and
  generating a prediction of the corresponding cookie information based on application of the model to the corresponding request attributes.

2. The method of claim 1, wherein the first request attributes comprises one or more attribute types that are unavailable in the second request attributes.

3. The method of claim 1, wherein the first request attributes comprises one or more attribute types and complete attribute data corresponding thereto, and the second request attributes comprises incomplete or unavailable attribute data corresponding to the one or more attribute types.

4. The method of claim 1 further comprising:
  classifying, by the data processing system, a set of device attributes using the model.

5. The method of claim 1 further comprising:
sending, by the data processing system, the model to a computing device for classifying a set of device attributes using the model.

6. The method of claim 1, wherein determining, by the data processing system, the difference between the first internal data and the second internal data comprises:
calculating a loss of the model using a loss function at least partly based on a predetermined domain adaptation technique.

7. The method of claim 6, wherein the loss function comprises an adjustment term determined based on the predetermined domain adaptation technique.

8. The method of claim 7, wherein the predetermined domain adaptation technique consists of one or more of: correlational alignment, reverse gradient, importance reweighting, and maximum mean discrepancy.

9. The method of claim 7, wherein the layer of the model is selected based on the predetermined domain adaptation technique.

10. The method of claim 1, wherein determining, by the data processing system, the difference between the first internal data and the second internal data comprises calculating a loss of the model using a loss function at least partly based on minimizing a difference in two covariances, each calculated based on the first internal data and the second internal data.

11. A system comprising:
a memory device; and
one or more hardware processors configured to perform operations comprising:
obtaining a first plurality of requests for content that include cookie information and first request attributes, wherein the cookie information includes device attributes of devices that submitted the first plurality of requests for content;
obtaining a second plurality of requests that include second request attributes, but do not include the cookie information; and
training a model, comprising:
propagating the first request attributes of a first client device through the model to generate first internal data extracted from a layer of the model;
generating a first output vector by propagating the first request attributes through the model to an output layer;
propagating the second request attributes of a second client device through the model to generate second internal data extracted from the layer of the model;
determining a difference between the first internal data and the second internal data;
updating weights of the model based on the difference between the first internal data and the second internal data, and a difference between the first output vector and the device attributes of the first client device;
after training the model, receiving a new content request that includes corresponding request attributes, but does not include corresponding cookie information; and
generating a prediction of the corresponding cookie information based on application of the model to the corresponding request attributes.

12. The system of claim 11, wherein the first request attributes comprises one or more attribute types that are unavailable in the second request attributes.

13. The system of claim 11, wherein the first request attributes comprises one or more attribute types and complete attribute data corresponding thereto, and the second request attributes comprises incomplete or unavailable attribute data corresponding to the one or more attribute types.

14. The system of claim 11 further comprising:
classifying a set of device attributes using the model.

15. The system of claim 11 further comprising:
sending the model to a computing device for classifying a set of device attributes using the model.

16. The system of claim 11, wherein determining the difference between the first internal data and the second internal data comprises:
calculating a loss of the model using a loss function at least partly based on a predetermined domain adaptation technique.

17. The system of claim 16, wherein the loss function comprises an adjustment term determined based on the predetermined domain adaptation technique.

18. The system of claim 17, wherein the predetermined domain adaptation technique consists of one or more of: correlational alignment, reverse gradient, importance reweighting, and maximum mean discrepancy.

19. The system of claim 11, wherein determining the difference between the first internal data and the second internal data comprises calculating a loss of the model using a loss function at least partly based on minimizing a difference in two covariances, each calculated based on the first internal data and the second internal data.

20. A non-transitory computer readable medium storing executable instructions that, upon execution, by one or more processors, cause the one or more processors to perform operations comprising:
obtaining, by a data processing system comprising one or more processors and a memory, a first plurality of requests for content from a respective first plurality of client devices of a first domain, the respective first plurality of client devices having device attributes, each of the first plurality of requests having first request attributes;
obtaining a first plurality of requests for content that include cookie information and first request attributes, wherein the cookie information includes device attributes of devices that submitted the first plurality of requests for content;
obtaining a second plurality of requests that include second request attributes, but do not include the cookie information; and
training a model, comprising:
propagating the first request attributes of a first client device through the model to generate first internal data extracted from a layer of the model;
generating a first output vector by propagating the first request attributes through the model to an output layer;
propagating the second request attributes of a second client device through the model to generate second internal data extracted from the layer of the model;
determining a difference between the first internal data and the second internal data;
updating weights of the model based on the difference between the first internal data and the second internal data, and a difference between the first output vector and the device attributes of the first client device;
after training the model, receiving a new content request that includes corresponding request attributes, but does not include corresponding cookie information; and generating a prediction of the corresponding cookie information based on application of the model to the corresponding request attributes.

* * * * *